United States Patent
Andou et al.

(10) Patent No.: US 6,402,956 B1
(45) Date of Patent: Jun. 11, 2002

(54) TREATMENT SYSTEM AND TREATMENT METHOD EMPLOYING SPIRAL WOUND TYPE MEMBRANE MODULE

(75) Inventors: Masaaki Andou; Hajimu Hisada; Ichirou Kawada, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/488,416

(22) Filed: Jan. 20, 2000

(30) Foreign Application Priority Data

Jan. 22, 1999 (JP) ............................................ 11-014966
Jun. 10, 1999 (JP) ............................................ 11-164085

(51) Int. Cl.⁷ ............................................ B01D 61/00
(52) U.S. Cl. ................. 210/650; 210/651; 210/652; 210/321.74; 210/321.83; 210/641; 210/433.1; 210/435
(58) Field of Search ............... 210/321.74, 321.83, 210/493.4, 493.5, 652, 641, 433.1, 435, 636, 650

(56) References Cited

U.S. PATENT DOCUMENTS

| | | | | |
|---|---|---|---|---|
| 3,386,583 A | * | 6/1968 | Merten | |
| 4,046,685 A | * | 9/1977 | Bray | |
| 4,083,780 A | * | 4/1978 | Call | |
| 4,293,419 A | * | 10/1981 | Sekino et al. | |
| 4,301,013 A | * | 11/1981 | Setti et al. | |
| 4,548,714 A | * | 10/1985 | Kirwan, Jr. et al. | |
| 4,600,512 A | * | 7/1986 | Aid | |
| 4,609,466 A | * | 9/1986 | McCausland et al. | |
| 4,906,372 A | * | 3/1990 | Hopkins | |
| 5,128,037 A | * | 7/1992 | Pearl et al. | |
| 5,156,739 A | * | 10/1992 | Dawson et al. | |
| 5,192,437 A | * | 3/1993 | Chang et al. | |
| 6,007,723 A | * | 12/1999 | Ikada et al. | |
| 6,139,750 A | * | 10/2000 | Graham | |

FOREIGN PATENT DOCUMENTS

| | | | |
|---|---|---|---|
| EP | 0414082 | * | 11/1990 |
| JP | 10-165780 | | 6/1998 |
| JP | 10-230144 | | 9/1998 |
| JP | 11-188245 | | 7/1999 |

* cited by examiner

Primary Examiner—Ana Fortuna
(74) Attorney, Agent, or Firm—Akin, Gump, Strauss, Hauer & Feld, L.L.P.

(57) ABSTRACT

In a treatment system, a spiral wound type membrane module is provided on a preceding stage of a reverse osmosis membrane separation device for performing pretreatment with the spiral wound type membrane module. The spiral wound type membrane module is formed by charging a pressure vessel with a spiral wound type membrane element. The spiral wound type membrane element is formed by covering a spiral membrane component, prepared by winding a plurality of independent or continuous envelope-like membranes on the outer peripheral surface of a water collection pipe, with a separation membrane and further covering the same with an outer peripheral passage forming member.

21 Claims, 18 Drawing Sheets

TREATMENT SYSTEM AND TREATMENT METHOD EMPLOYING SPIRAL WOUND TYPE MEMBRANE MODULE

BACKGROUND OF THE INVENTION

1. Field of the Invention

The present invention relates to a treatment system and a treatment method employing a spiral wound type membrane module.

2. Description of the Background Art

A reverse osmosis membrane (RO membrane) separation device is employed for desalinating seawater, producing ultrapure water or the like. Coagulation precipitation sand filtration is mainly performed as pretreatment for the reverse osmosis membrane separation device. In such coagulation precipitation sand filtration, the quality of treated water varies with the quality of raw water, and hence treated water having stable quality cannot be supplied to the reverse osmosis membrane separation device. Thus, the ability of the reverse osmosis membrane separation device is limited.

The membrane separation technique is recently applied as pretreatment for the reverse osmosis membrane separation device. A hollow fiber membrane element is mainly employed for such pretreatment.

FIG. 18 illustrates an exemplary conventional treatment system employing a reverse osmosis membrane separation device 406.

Referring to FIG. 18, a reservoir 401 stores raw water such as river water. The raw water is supplied from the reservoir 401 to a supply pump 402 through a pipe 407, and further supplied to a hollow fiber membrane element 403 by the supply pump 402. The hollow fiber membrane element 403 separates the raw water into permeate and concentrate. The permeate obtained by the hollow fiber membrane element 403 is supplied to a reservoir 404 through a pipe 408 as pretreated water. The concentrate obtained by the hollow fiber membrane element 403 is returned to the reservoir 401 through a pipe 409.

The pretreated water stored in the reservoir 404 is supplied to a pump 405 through a pipe 410, and further supplied to the reverse osmosis membrane separation device 406 by the pump 405. The reverse osmosis membrane separation device 406 separates the pretreated water into permeate and concentrate. The permeate obtained by the reverse osmosis membrane separation device 406 is taken out through a pipe 411. The concentrate obtained by the reverse osmosis membrane separation device 406 is returned to the reservoir 401 through a pipe 412.

In the aforementioned conventional treatment system, the pretreated water obtained by the hollow fiber membrane element 403 must be temporarily stored in the reservoir 404, and the pretreated water must be supplied to the reverse osmosis membrane separation device 406 from the reservoir 404 by the pump 405. Thus, the system cost as well as the size of the system are increased due to the necessity for the reservoir 404 and the pump 405.

The hollow fiber membrane element 403 can attain a large membrane area (volumetric efficiency) per unit volume, but the membrane is disadvantageously easy to break. If the membrane of the hollow fiber membrane element 403 is broken, the quality of the pretreated water supplied to the reverse osmosis membrane separation device 406 is disadvantageously reduced.

SUMMARY OF THE INVENTION

An object of the present invention is to provide a treatment system, which can be reduced in cost and miniaturized, having high reliability.

A treatment system according to an aspect of the present invention comprises a spiral wound type membrane module including a pressure vessel having a raw liquid inlet and one or a plurality of spiral wound type membrane elements stored in the pressure vessel, one or a plurality of reverse osmosis membrane separation devices, provided on a succeeding stage of the spiral wound type membrane module, including reverse osmosis membranes, and a first duct, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, the raw liquid passage forming member is arranged to supply a raw liquid, supplied into the pressure vessel through the raw liquid inlet, into the perforated hollow pipe from at least the outer peripheral side of the spiral wound type membrane element, and the first duct is provided to supply a permeated liquid taken out from at least one opening end of the perforated hollow pipe to the one or a plurality of reverse osmosis membrane separation devices.

In the treatment system, the raw liquid is supplied to the spiral wound type membrane module, and the permeated liquid taken out from the spiral wound type membrane module is supplied to the reverse osmosis membrane separation device.

In this case, the raw liquid is supplied from at least the outer peripheral side of the spiral wound type membrane element through the raw liquid inlet of the pressure vessel, for performing dead end filtration. Contaminants contained in the raw liquid are captured on at least the outer peripheral portion of the spiral wound type membrane element. The contaminants captured on the outer peripheral portion are readily removed in back wash reverse filtration.

As described above, dead end filtration is performed in the spiral wound type membrane element, whereby a pump for supplying the raw liquid to the spiral wound type membrane module may not have a large size. Further, the permeated liquid taken out from the spiral wound type membrane module can be directly fed to the reverse osmosis membrane separation device with pressure by the pump.

In this case, pressure is applied to the spiral wound type membrane element from all directions, whereby the spiral wound type membrane element is not deformed even if the raw liquid is supplied under high pressure, and high pressure resistance is attained. Thus, the raw liquid can be supplied with high pressure by the pump for supplying the raw liquid to the spiral wound type membrane module.

In the aforementioned treatment system, neither a pump nor a reservoir is required for supplying the permeated liquid taken out from the spiral wound type membrane module to the reverse osmosis membrane separation device, whereby the system cost is reduced and the system is miniaturized.

In pretreatment with the spiral wound type membrane module, the quality of the permeated liquid is not varied with the quality of the raw liquid dissimilarly to the coagulation precipitation.sand filtration method. Therefore, a pretreated liquid having stable quality can be regularly supplied to the reverse osmosis membrane separation device, not to reduce the ability of the reverse osmosis membrane separation device.

No dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane for separating a fluid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced.

In the treatment system, the one or a plurality of reverse osmosis membrane separation devices may include a plurality of serially connected reverse osmosis membrane separation devices, the first duct may be provided to supply the permeated liquid to a preceding stage reverse osmosis membrane separation device among the plurality of serially connected reverse osmosis membrane separation devices, and the treatment system may further comprise a second duct supplying the permeated liquid from the preceding stage reverse osmosis membrane separation device to a succeeding stage reverse osmosis membrane separation device, and a third duct returning a concentrated liquid from the succeeding stage reverse osmosis membrane separation device to the supply side of the preceding stage reverse osmosis membrane separation device.

In this case, the succeeding stage reverse osmosis membrane separation device further separates the permeated liquid from the preceding stage reverse osmosis membrane separation device into a concentrated liquid and a permeated liquid. The concentrated liquid from the succeeding stage reverse osmosis membrane separation device is supplied to the supply side of the preceding stage reverse osmosis membrane separation device again. Thus, a permeated liquid having high quality can be obtained with high recovery.

The treatment system may further comprise an ion exchanger provided on a succeeding stage of the one or a plurality of reverse osmosis membrane separation devices for treating the permeated liquid from the one or a plurality of reverse osmosis membrane separation devices.

In this case, the ion exchanger further treats the permeated liquid from the reverse osmosis membrane separation device, whereby a permeated liquid (pure water) having higher quality is obtained.

The treatment system may further comprise one or a plurality of pretreaters provided on a preceding stage of the spiral wound type membrane module for performing prescribed pretreatment on the raw liquid supplied to the spiral wound type membrane module.

In this case, a liquid pretreated by the pretreater is supplied to the spiral wound type membrane module as the raw liquid, whereby a load on the spiral wound type membrane element is reduced. Thus, the spiral wound type membrane module can be stably run with high reliability over a long period, whereby a treatment system enabling more stable running with higher reliability is implemented.

Particularly in the treatment system, the pretreater may include at least one of a sand filtration treater, activated sludge process equipment, a microfiltration membrane separation device, a centrifugal separator, a dipped membrane separation device, a pressure floatation treater, a coagulator, precipitation equipment, an ozone treater, a strong acid water treater, an ultraviolet bactericidal treater and a sodium hypochlorite bactericidal treater. Such a pretreater supplies a pretreated liquid from which contaminants are removed or a sterilized pretreated liquid to the spiral wound type membrane module.

A treatment system according to another aspect of the present invention comprises one or a plurality of pretreaters performing prescribed pretreatment, a spiral wound type membrane module, provided on a succeeding stage of the pretreaters, including a pressure vessel having a raw liquid inlet and one or a plurality of spiral wound type membrane elements stored in the pressure vessel, and a duct, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, the duct is provided to supply a treated liquid discharged from the one or a plurality of pretreaters into the pressure vessel through the raw liquid inlet, and the raw liquid passage forming member is arranged to supply the treated liquid, supplied into the pressure vessel, into the perforated hollow pipe from at least the outer peripheral side of the spiral wound type membrane element.

In the treatment system, the treated liquid pretreated by the pretreater is supplied to the spiral wound type membrane module, whereby a load on the spiral wound type membrane element is reduced. Thus, the spiral wound type membrane module can be stably run with high reliability over a long period.

In this case, the treated liquid discharged from the pretreater is supplied from at least the outer peripheral side of the spiral wound type membrane element through the raw liquid inlet of the pressure vessel for performing dead end filtration. Contaminants contained in the treated liquid discharged from the pretreater are captured on at least the outer peripheral portion of the spiral wound type membrane element. The contaminants captured on the outer peripheral portion are readily removed in back wash reverse filtration.

No dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, the treated liquid discharged from the pretreater is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots.

Thus, neither packing holders nor a protective sheath is required, whereby the component cost and the manufacturing cost are reduced. In addition, high recovery is attained without employing a large pump for supplying the treated liquid from the pretreater due to dead end filtration. Thus, the system cost is reduced.

Further, pressure is applied to the spiral wound type membrane element from all directions, whereby the spiral wound type membrane element is not deformed even if the treated liquid from the pretreater is supplied under high pressure. Thus, high pressure resistance is attained.

Particularly in the treatment system, the pretreater may include at least one of a sand filtration treater, activated sludge process equipment, a microfiltration membrane separation device, a centrifugal separator, a dipped membrane separation device, a pressure floatation treater, a coagulator, precipitation equipment, an ozone treater, a strong acid water treater, an ultraviolet bactericidal treater and a sodium hypochlorite bactericidal treater. Such a pretreater supplies a pretreated liquid from which contaminants are removed or a sterilized pretreated liquid to the spiral wound type membrane module.

A treatment system according to still another aspect of the present invention comprises one or a plurality of pretreaters performing prescribed pretreatment and supplying a treated liquid to a prescribed succeeding stage system, a spiral wound type membrane module including a pressure vessel having a raw liquid inlet and one or a plurality of spiral wound type membrane elements stored in the pressure vessel, and a duct, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, the duct is provided to supply a washing liquid, discharged from the one or a plurality of pretreaters in back wash reverse filtration of the one or a plurality of pretreaters, into the pressure vessel through the raw liquid inlet, and the raw liquid passage forming member is arranged to supply the washing liquid, supplied into the pressure vessel, into the perforated hollow pipe from at least the outer peripheral side of the spiral wound type membrane element.

In the treatment system, the washing liquid discharged from the pretreater in back wash reverse filtration is supplied to the spiral wound type membrane module. Thus, the spiral wound type membrane module removes contaminants contained in the washing liquid discharged from the pretreater, whereby the discharged washing liquid can be effectively utilized. In this case, the washing liquid discharged from the pretreater is supplied from at least the outer peripheral side of the spiral wound type membrane element through the raw liquid inlet of the pressure vessel for performing dead end filtration. Contaminants contained in the discharged washing liquid are captured on at least the outer peripheral portion of the spiral wound type membrane element. The contaminants captured on the outer peripheral portion are readily discharged in back wash reverse filtration.

In the aforementioned spiral wound type membrane module, no dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, the spiral wound type membrane module attains high recovery without employing a large pump for supplying the washing liquid discharged from the pretreater due to dead end filtration. Thus, the system cost is reduced.

Further, pressure is applied to the spiral wound type membrane element from all directions, whereby the spiral wound type membrane element is not deformed even if the discharged washing liquid is supplied under high pressure. Thus, high pressure resistance is attained.

In the treatment system, the pretreater may include a sand filtration treater or an activated carbon treater.

In the treatment system according to the present invention, the pressure vessel of the spiral wound type membrane module may further have a raw liquid outlet so that part of the treated liquid is regularly or intermittently taken out from the pressure vessel through the raw liquid outlet. Further, at least part of the taken-out treated liquid may be returned to the supply side of the spiral wound type membrane module again. In this case, a flow of the treated liquid can be formed axially along the outer peripheral portion of the spiral wound type membrane element by taking out part of the treated liquid. Thus, contaminants contained in the treated liquid can be inhibited from adhering to the membrane surface and at least the outer peripheral portion of the spiral wound type membrane element, and part of the contaminants can be discharged with the treated liquid. In addition, the treated liquid (permeated liquid) is obtained with high recovery in the spiral wound type membrane module by returning at least part of the taken-out treated liquid to the supply side again.

A treatment method according to a further aspect of the present invention employs a treatment system comprising a spiral wound type membrane module including a pressure vessel having a raw liquid inlet and one or a plurality of spiral wound type membrane elements stored in the pressure vessel and one or a plurality of reverse osmosis membrane separation devices, provided on a succeeding stage of the spiral wound type membrane module, including a reverse osmosis membrane, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, and the method comprises steps of supplying a raw liquid from at least the outer peripheral side of the spiral wound type membrane element through the raw liquid inlet of the spiral wound type membrane module and taking out a permeated liquid from at least one opening end of the perforated hollow pipe, and supplying the taken-out permeated liquid to the one or a plurality of reverse osmosis membrane separation devices.

In this case, the raw liquid is supplied from at least the outer peripheral side of the spiral wound type membrane element through the raw liquid inlet of the pressure vessel for performing dead end filtration. Contaminants contained in the raw liquid are captured on at least the outer peripheral portion of the spiral wound type membrane element. The contaminants captured on the outer peripheral portion are readily removed in back wash reverse filtration.

As described above, dead end filtration is performed in the spiral wound type membrane module, whereby a pump for supplying the raw liquid to the spiral wound type membrane module may not have a large size. Further, the permeated liquid taken out from the spiral wound type membrane module can be directly fed to the reverse osmosis membrane separation device with pressure by the pump.

In this case, pressure is applied to the spiral wound type membrane element from all directions, whereby the spiral wound type membrane element is not deformed even if the raw liquid is supplied under high pressure, and high pressure resistance is attained. Thus, the raw liquid can be supplied with high pressure by the pump for supplying the raw liquid to the spiral wound type membrane module.

In the aforementioned treatment system, neither a pump nor a reservoir is required for supplying the permeated liquid taken out from the spiral wound type membrane module to the reverse osmosis membrane separation device, whereby the system cost is reduced and the system is miniaturized.

In pretreatment with the spiral wound type membrane module, the quality of the permeated liquid is not varied with the quality of the raw liquid dissimilarly to the coagulation precipitation.sand filtration method. Therefore, a pretreated liquid having stable quality can be regularly supplied to the reverse osmosis membrane separation device, not to reduce the ability of the reverse osmosis membrane separation device.

No dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, the raw liquid is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced.

In the treatment method, the one or a plurality of reverse osmosis membrane separation devices may include a plurality of serially connected reverse osmosis membrane separation devices, and the treatment method may further comprise steps of supplying the permeated liquid from a preceding stage reverse osmosis membrane separation device to a succeeding stage reverse osmosis membrane separation device among the plurality of serially connected reverse osmosis membrane separation devices, and returning a concentrated liquid from the succeeding stage reverse osmosis membrane separation device to the supply side of the preceding stage reverse osmosis membrane separation device.

In this case, the succeeding stage reverse osmosis membrane separation device further separates the permeated liquid from the preceding stage reverse osmosis membrane separation device into a concentrated liquid and a permeated liquid. The concentrated liquid from the succeeding stage reverse osmosis membrane separation device is returned to the supply side of the preceding stage reverse osmosis membrane separation device again. Thus, a permeated liquid having high quality can be obtained with high recovery.

In the treatment method, the treatment system may further comprise an ion exchanger provided on a succeeding stage of the one or a plurality of reverse osmosis membrane separation devices, and the treatment method may further comprise a step of supplying the permeated liquid from the one or a plurality of reverse osmosis membrane separation devices to the ion exchanger.

In this case, the ion exchanger further treats the permeated liquid from the reverse osmosis membrane separation device, whereby a permeated liquid (pure water) having higher quality can be obtained.

In the treatment method, the treatment system may further comprise one or a plurality of pretreaters provided on a preceding stage of the spiral wound type membrane module, the treatment method may further comprise a step of performing prescribed pretreatment with the one or a plurality of pretreaters, and the step of supplying a raw liquid may include a step of supplying a treated liquid discharged from the pretreater to the spiral wound type membrane module as the raw liquid.

In this case, the treated liquid pretreated by the pretreater is supplied to the spiral wound type membrane module, whereby a load on the spiral wound type membrane element is reduced. Thus, the spiral wound type membrane module can be stably run with high reliability over a long period, whereby a treatment system enabling stable running with high reliability is implemented.

Particularly in the treatment method, the step of performing pretreatment may include a step of performing at least one of treatment with a sand filtration treater, treatment with activated sludge process equipment, treatment with a microfiltration membrane separation device, treatment with a centrifugal separator, treatment with a dipped membrane separation device, treatment with a pressure floatation treater, treatment with a coagulator, treatment with precipitation equipment, treatment with an ozone treater, treatment with a strong acid water treater, treatment with an ultraviolet bactericidal treater and treatment with a sodium hypochlorite bactericidal treater.

Such a pretreater can supply a treated liquid from which contaminants are removed or a sterilized treated liquid to the spiral wound type membrane module.

In the treatment method, the step of supplying a raw liquid may include a step of continuously or intermittently feeding a partial raw liquid axially along the outer peripheral portion of the spiral wound type membrane element and taking out the partial raw liquid from the pressure vessel. Thus, contaminants contained in the raw liquid can be inhibited from adhering to the membrane surface and at least the outer peripheral portion of the spiral wound type membrane element, and part of the contaminants can be discharged with the raw liquid. At least part of the taken-out raw liquid may be returned to the supply side of the spiral wound type membrane module again. Thus, the permeated liquid can be obtained with high recovery in the spiral wound type membrane module.

A treatment method according to a further aspect of the present invention employs a treatment system comprising one or a plurality of pretreaters and a spiral wound type membrane module, provided on a succeeding stage of the one or a plurality of pretreaters, including a pressure vessel having a raw liquid inlet and one or a plurality of spiral wound type membrane elements stored in the pressure vessel, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, and the treatment method comprises steps of performing prescribed pretreatment with the pretreater, and supplying a treated liquid, discharged from the pretreater, from at least the outer peripheral side of the spiral wound type membrane element through the raw liquid inlet of the spiral wound type membrane module and taking out a permeated liquid from at least one opening end of the perforated hollow pipe.

In the treatment method, the treated liquid pretreated by the pretreater is supplied to the spiral wound type membrane module, whereby a load on the spiral wound type membrane element is reduced. Thus, the spiral wound type membrane module can be stably run with high reliability over a long period.

In this case, the treated liquid discharged from the pretreater is supplied from at least the outer peripheral side of the spiral wound type membrane element through the raw liquid inlet of the pressure vessel, for performing dead end filtration. Contaminants contained in the treated liquid discharged from the pretreater are captured on at least the outer peripheral portion of the spiral wound type membrane element. The contaminants captured on the outer peripheral portion are readily removed in back wash reverse filtration.

No dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, the treated liquid discharged from the pretreater is supplied from at least the outer peripheral side of the spiral wound type membrane element and pressure is applied to the spiral wound type membrane element from all directions with no pressure causing axial displacement, whereby the envelope-like membranes wound around the perforated hollow pipe are not deformed in the form of bamboo shoots.

Thus, neither packing holders nor a protective sheath is required, whereby the component cost and the manufacturing cost are reduced. In addition, high recovery is attained without employing a large pump for supplying the treated liquid due to dead end filtration. Thus, the system cost is reduced.

Further, pressure is applied to the spiral wound type membrane element from all directions, whereby the spiral wound type membrane element is not deformed even if the treated liquid from the pretreater is supplied under high pressure. Thus, high pressure resistance is attained.

Particularly in the treatment method, the step of performing pretreatment may include a step of performing at least one of treatment with a sand filtration treater, treatment with activated sludge process equipment, treatment with a microfiltration membrane separation device, treatment with a centrifugal separator, treatment with a dipped membrane separation device, treatment with a pressure floatation treater, treatment with a coagulator, treatment with precipitation equipment, treatment with an ozone treater, treatment with a strong acid water treater, treatment with an ultraviolet bactericidal treater and treatment with a sodium hypochlorite bactericidal treater.

Such a pretreater can supply a treated liquid from which contaminants are removed or a sterilized treated liquid to the spiral wound type membrane module.

In the treatment method, the step of supplying a treated liquid may include a step of continuously or intermittently feeding a partial treated liquid axially along the outer peripheral portion of the spiral wound type membrane element and taking out the partial treated liquid from the pressure vessel. Thus, contaminants contained in the treated liquid can be inhibited from adhering to the membrane surface and at least the outer peripheral portion of the spiral wound type membrane element, and part of the contaminants can be discharged with the treated liquid. Further, at least part of the taken-out treated liquid may be returned to the supply side of the spiral wound type membrane module again. Thus, the permeated liquid is obtained with high recovery in the spiral wound type membrane module.

A treatment method according to a further aspect of the present invention employs a treatment system comprising one or a plurality of pretreaters performing prescribed pretreatment and supplying a treated liquid to a prescribed succeeding stage system, and a spiral wound type membrane module including a pressure vessel having a raw liquid inlet and one or a plurality of spiral wound type membrane elements stored in the pressure vessel, the spiral wound type membrane element includes a spiral membrane component including a perforated hollow pipe, a plurality of independent or continuous envelope-like membranes wound around the outer peripheral surface of the perforated hollow pipe and a raw liquid passage forming member interposed between the plurality of envelope-like membranes, a liquid-permeable material covering the outer peripheral portion of the spiral membrane component, and an outer peripheral passage forming member entirely or partially covering the outer peripheral surface of the liquid-permeable material, and the treatment method comprises steps of performing back wash reverse filtration of the one or a plurality of pretreaters, and supplying a washing liquid, discharged from the one or a plurality of pretreaters in back wash reverse filtration, from at least the outer peripheral side of the spiral wound type membrane element through the raw liquid inlet of the spiral wound type membrane module and taking out a permeated liquid from at least one opening end of the perforated hollow pipe.

In the treatment method, the washing liquid discharged from the pretreater in back wash reverse filtration is supplied to the spiral wound type membrane module for removing contaminants with the spiral wound type membrane module. Thus, the washing liquid discharged from the pretreater can be effectively utilized.

In this case, the washing liquid discharged from the pretreater is supplied from at least the outer peripheral side of the spiral wound type membrane element through the raw liquid inlet of the pressure vessel for performing dead end filtration. Contaminants contained in the discharged washing liquid are captured on at least the outer peripheral portion of the spiral wound type membrane element. The contaminants captured on the outer peripheral portion are readily discharged in back wash reverse filtration.

In the aforementioned spiral wound type membrane module, no dead space is defined in the clearance between the spiral wound type membrane element and the pressure vessel due to dead end filtration, to allow no residence of the fluid in the clearance between the spiral wound type membrane element and the pressure vessel. Also when employing the spiral wound type membrane element for separating a fluid containing organic matter, therefore, high reliability is attained with no problems such as propagation of germs such as microorganisms, occurrence of a bad smell resulting from decomposition of the organic matter, decomposition of separation membranes and the like.

Further, pressure is applied to the spiral wound type membrane element from all directions with no pressure causing axial displacement, whereby the envelope-like membranes wound around the perforated hollow pipe are not deformed in the form of bamboo shoots. Thus, neither packing holders nor a protective sheath is required, whereby the component cost and the manufacturing cost are reduced. In addition, high recovery is attained in the spiral wound type membrane module without employing a large pump for supplying the washing liquid discharged from the pretreater due to dead end filtration. Thus, the system cost is reduced.

Further, pressure is applied to the spiral wound type membrane element from all directions, whereby the spiral wound type membrane element is not deformed even if the discharged washing liquid is supplied under high pressure. Thus, high pressure resistance is attained.

In the treatment method, the pretreater may include a sand filtration treater or an activated carbon treater.

In the treatment method, the step of supplying a washing liquid may include a step of continuously or intermittently feeding a partial washing liquid axially along the outer peripheral portion of the spiral wound type membrane element and taking out the partial washing liquid from the pressure vessel. Thus, contaminants contained in the washing liquid can be inhibited from adhering to the membrane surface and at least the outer peripheral portion of the spiral wound type membrane element, and part of the contaminants can be discharged with the washing liquid. Further, at least part of the taken-out washing liquid may be returned to the supply side of the spiral wound type membrane module again. Thus, the permeated liquid is obtained with high recovery in the spiral wound type membrane module.

These and other objects, features, aspects and advantages of the present invention will become apparent from the following detailed description of the present invention when taken in conjunction with the accompanying drawings.

DESCRIPTION OF THE PREFERRED EMBODIMENTS

A treatment system according to the present invention performs pretreatment for a reverse osmosis membrane separation device with a spiral wound type membrane module having a spiral wound type membrane element described below.

Figure 1:
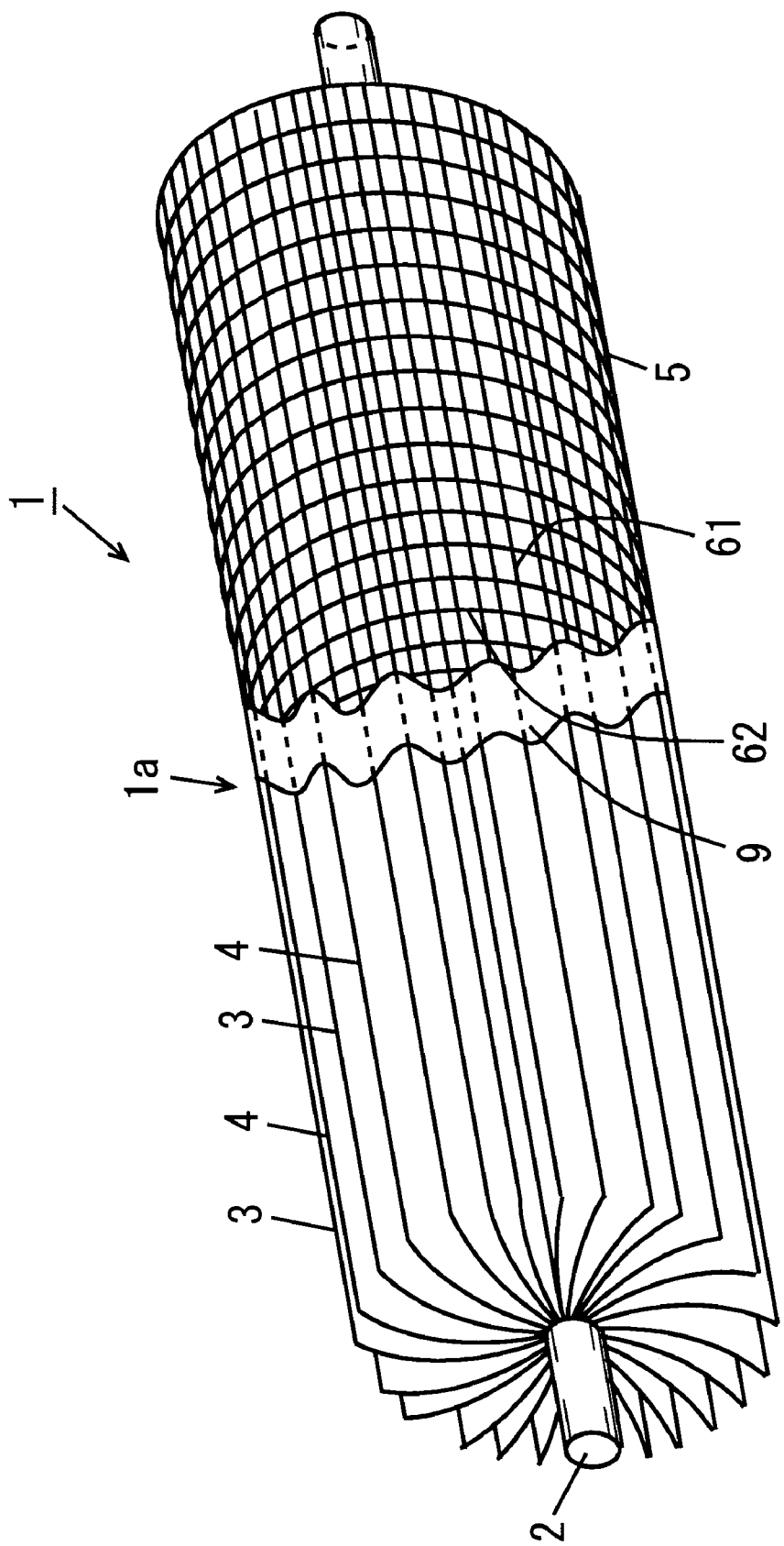
FIG. 1 is a partially fragmented perspective view showing an exemplary spiral wound type membrane element employed in a treatment system according to the present invention.
Figure 2:
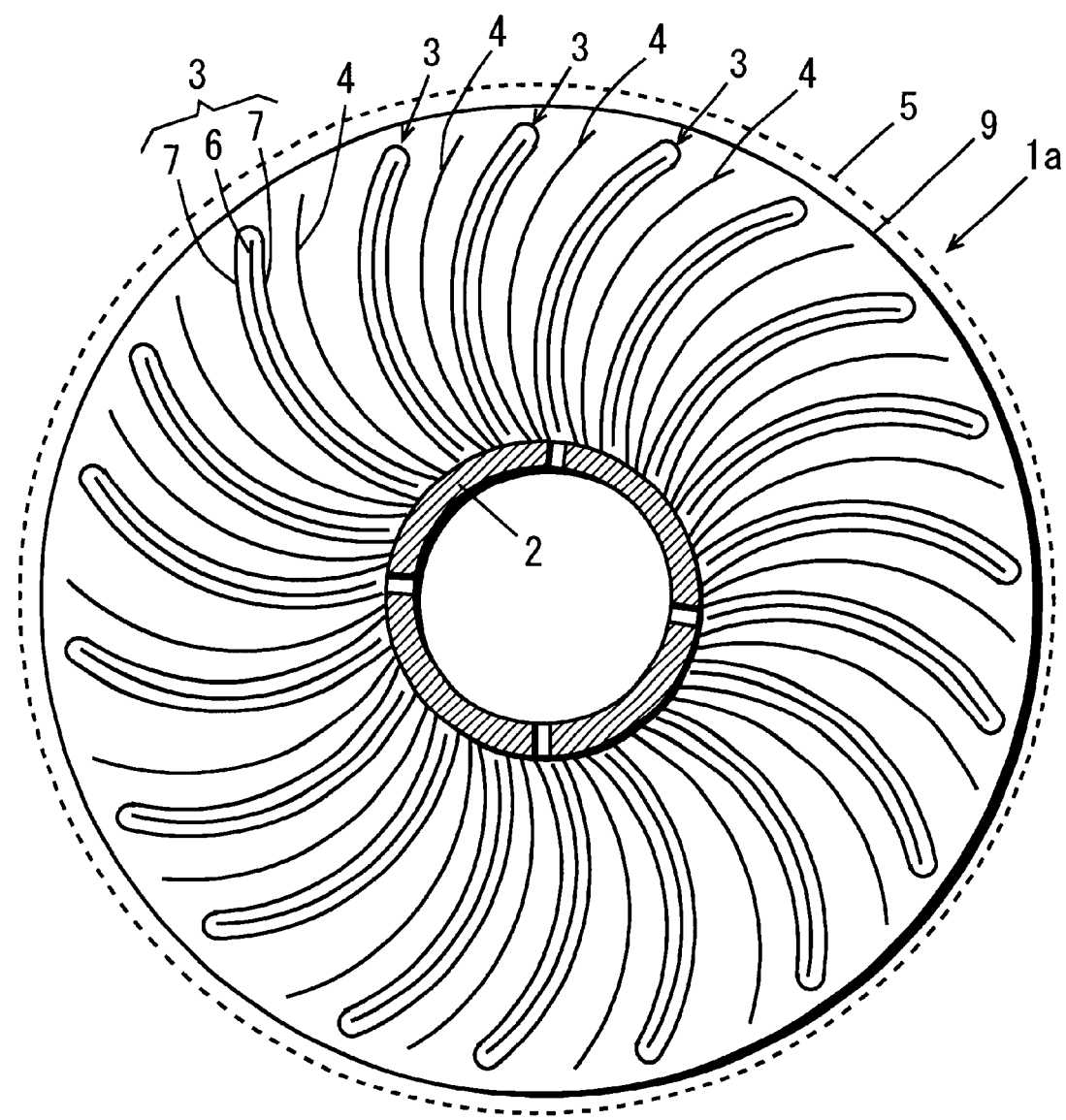
FIG. 2 is a cross-sectional view showing exemplary envelope-like membranes of the spiral wound type membrane element shown in FIG. 1.
Figure 3:
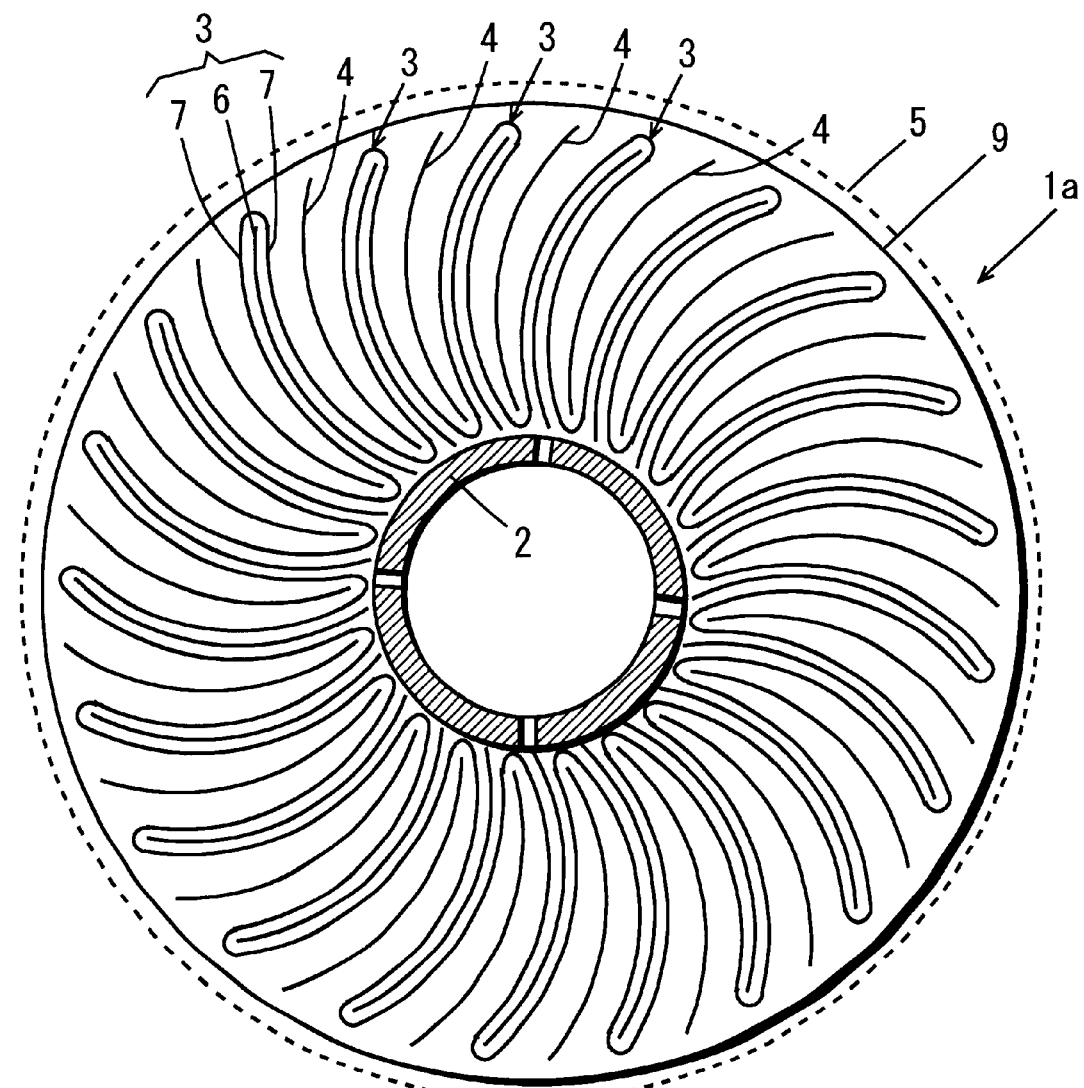
FIG. 3 is a cross-sectional view showing other exemplary envelope-like membranes of the spiral wound type membrane element shown in FIG. 1.

FIG. 1 is a partially fragmented perspective view showing an exemplary spiral wound type membrane element 1 employed in a treatment system according to the present invention. FIG. 2 is a cross-sectional view showing exemplary envelope-like membranes of the spiral wound type membrane element 1 shown in FIG. 1, and FIG. 3 is a cross-sectional view showing other exemplary envelope-like membranes of the spiral wound type membrane element 1 shown in FIG. 1.

The spiral wound type membrane element 1 shown in FIG. 1 includes a spiral membrane component 1a formed by winding a plurality of independent envelope-like membranes 3 or a plurality of continuous envelope-like membranes 3 around the outer peripheral surface of a water collection pipe 2 formed by a perforated hollow pipe. Raw water spacers (raw water passage forming members) 4 are inserted between the envelope-like membranes 3 for preventing the envelope-like membranes 3 from coming into close contact with each other and reducing the membrane area and for forming a passage for raw water.

The outer peripheral surface of the spiral membrane component 1a is covered with a separation membrane 9 made of a liquid-permeable material. This separation membrane 9 is formed by a microfiltration membrane or an ultrafiltration membrane.

The microfiltration membrane can be prepared from a polymer organic membrane of polyolefine, polysulfone, polypropylene, polyethylene, polystyrene, polyacrylonitrile or cellulose acetate. The ultrafiltration membrane can be prepared from a polymer organic membrane of polysulfone, polypropylene, polystyrene, polyacrylonitrile, cellulose acetate or polyethylene.

The outer peripheral surface of the separation membrane 9 is covered with an outer peripheral passage forming member 5 formed by a net. The net can be prepared from a polymer material such as polyolefine, polysulfone, polypropylene, polyethylene, polystyrene, polyacrylonitrile or cellulose acetate, an inorganic material such as ceramic, metal, synthetic rubber or fiber.

The pore size of the microfiltration membrane is preferably at least 0.01 $\mu$m and not more than 10 $\mu$m. As to the pore size of the ultrafiltration membrane, the molecular cutoff is preferably at least 20000 and the pore size is preferably not more than 0.01 $\mu$m. Further, the net employed as the outer peripheral passage forming member 5 preferably has at least four meshes and not more than 100 meshes.

The pore size of the microfiltration membrane or the ultrafiltration membrane employed as the separation membrane 9 and the number of the meshes forming the net employed as the outer peripheral passage forming member 5 are selected in response to the quality of raw water.

In the spiral wound type membrane element 1 shown in FIG. 1, the separation membrane 9 is formed by a microfiltration membrane of 0.4 $\mu$m in pore size made of polyolefine such as ethylene vinyl alcohol. Alternatively, the separation membrane 9 may be formed by an ultrafiltration membrane made of polysulfone. The outer peripheral passage forming member 5 is formed by a net of 50 meshes made of PET (polyethylene terephthalate).

The separation film 9 may also cover the end surfaces of the spiral membrane component 1a, in addition to the outer peripheral surface.

As shown in FIGS. 2 and 3, each envelope-like membrane 3 is formed by superposing two separation membranes 7 on both sides of a permeate spacer (permeate passage forming member) 6 and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm$^2$, ultrafiltration membranes or microfiltration membranes.

In the example shown in FIG. 2, the plurality of envelope-like membranes 3 are formed by independent separation membranes 7 respectively. In the example shown in FIG. 3, the plurality of envelope-like membranes 3 are formed by folding a continuous separation membrane 7.

If the thickness of the raw water spacers 4 is larger than 0.5 mm, it is difficult to capture contaminants contained in raw water on at least the outer peripheral portion of the spiral wound type membrane element 1. If the thickness of the raw water spacers 4 is smaller than 0.1 mm, the envelope-like membranes 3 readily come into contact with each other, to reduce the membrane area. Therefore, the thickness of the raw water spacers 4 is preferably at least 0.1 mm and not more than 0.5 mm.

As shown in FIG. 1, the outer peripheral passage forming member 5 is in the form of a lattice defined by a plurality of wires 61 and 62 perpendicularly intersecting with each other. The thickness of the wires 61 is set larger than that of the wires 62. Thus, raw water readily flows substantially linearly between the wires 61 in parallel with the wires 61.

As shown in FIG. 1, the outer peripheral passage forming member 5 is so arranged that the wires 61 are in parallel with the axial direction of the water collection pipe 2. Therefore, the raw water readily axially flows on the outer peripheral portion of the spiral membrane component 1a.

If the thickness of the outer peripheral passage forming member 5 is larger than 30 mm, the volumetric efficiency of the spiral wound type membrane element 1 is reduced with respect to a pressure vessel storing the spiral wound type membrane element 1. If the thickness of the outer peripheral passage forming member 5 is smaller than 0.6 mm, the flow velocity of the raw water for discharging contaminants adhering to at least the outer peripheral portion of the spiral wound type membrane element 1 from the system is reduced in back wash reverse filtration with permeate. Therefore, the thickness of peripheral passage forming member 5 is preferably at least 0.6 mm and not more than 30 mm.

The porosity of the outer peripheral passage forming member 5 along the thickness thereof is set to at least 20% and not more than 60%, for example. Thus, sufficient strength of the outer peripheral passage forming member 5 can be ensured while reducing the resistance of the raw water axially moving contaminants in back wash filtration. Further, the vertical and transverse pitches of the meshes forming the outer peripheral passage forming member 5 are set to at least 3 mm and not more than 30 mm, for example. Thus, the raw water can be sufficiently supplied between the envelope-like membranes 3 while preventing the outer peripheral surface of the spiral membrane component 1a from coming into contact with the pressure vessel and narrowing the passage for the raw water.

The separation membrane 9 covering the outer peripheral portion may be entirely or partially covered with the outer peripheral passage forming member 5.

Figure 4:
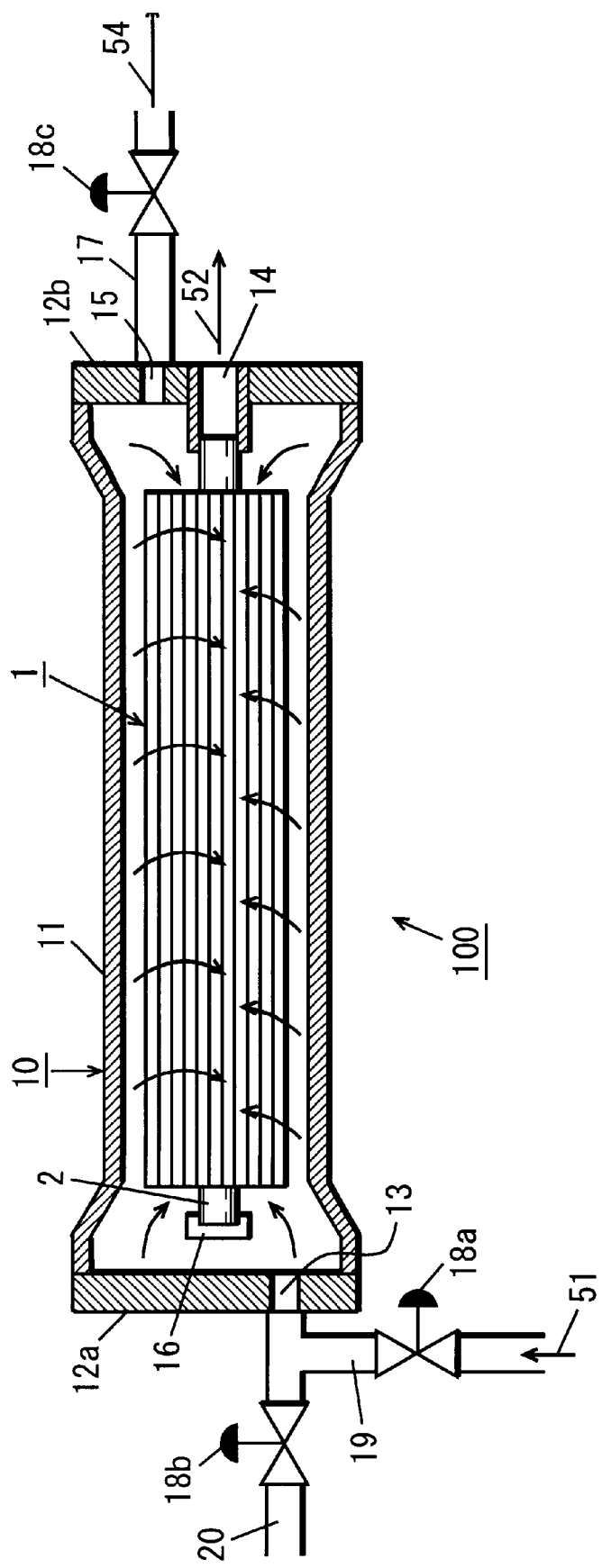
FIG. 4 is a sectional view showing an exemplary method a running a spiral wound type membrane module having the spiral wound type membrane element shown in FIG. 1.

FIG. 4 is a sectional view showing an exemplary method of running a spiral wound type membrane module having the spiral wound type membrane element 1 shown in FIG. 1.

As shown in FIG. 4, a pressure vessel (pressure-resistant vessel) 10 is formed by a tubular case 11 and a pair of end plates 12a and 12b. A raw water inlet 13 is formed on the end plate 12a, and a raw water outlet 15 is formed on the other end plate 12b. A permeate outlet 14 is provided on the center of the end plate 12b.

The tubular case 11 stores the spiral wound type membrane element 1, and both opening ends of the tubular case 11 are sealed with the end plates 12a and 12b respectively. One end of the water collection pipe 2 is engaged with the permeate outlet 14 of the end plate 12b, and an end cap 16 is attached to the other end. Thus, a spiral wound type membrane module 100 is formed by charging the pressure vessel 10 with the spiral wound type membrane element 1. The raw water inlet 13 of the end plate 12a is connected with a pipe 19, which in turn is connected with another pipe 20. The pipes 19 and 20 are provided with valves 18a and 18b respectively. The raw water outlet 15 of the end plate 12b is connected with a pipe 17, which is provided with a valve 18c.

In running of the spiral wound type membrane module 100, the valve 18a of the pipe 19 is opened and the valves 18b and 18c of the pipes 20 and 17 are closed. Raw water 51 is introduced into the pressure vessel 10 from the raw water inlet 13 thereof through the pipe 19. The raw water 51 flows along the outer peripheral passage forming member 5, permeates through the separation membrane 9 from at least the outer peripheral side of the spiral wound type membrane element 1 and infiltrates into the clearances between the envelope-like membranes 3 along the raw water spacers 4. In the example shown in FIG. 4, the raw water 51 infiltrates into the clearances between the envelope-like membranes 3 from the outer peripheral side and both ends of the spiral wound type membrane element 1. Permeate passing through the separation membranes 7 flows into the water collection pipe 2 along the permeate spacers 6. Thus, permeate 52 is taken out from the permeate outlet 14 of the pressure vessel 10. Thus, dead end filtration is performed.

In this case, the outer peripheral surface of the spiral membrane component 1a is covered with the separation membrane 9, whereby contaminants such as turbid substances larger than the pore size of the separation membrane 9 are captured on at least the outer peripheral portion of the spiral wound type membrane element 1. In other words, only contaminants smaller than the pore size of the separation film 9 infiltrate into the clearances between the envelope-like membranes 3. Thus, loads on the separation membranes 7 forming the envelope-like membranes 3 are reduced.

The valve 18c of the pipe 17 may be opened for taking out partial raw water 54 from the raw water outlet 15. In this case, a flow of the raw water can be formed on the outer peripheral portion of the spiral wound type membrane element 1. Thus, part of contaminants contained in the raw water can be discharged from the pressure vessel 10 while suppressing sedimentation of the contaminants. At least part of the taken-out raw water 54 may be circulated to be supplied as the raw water 51 again.

Figure 5:
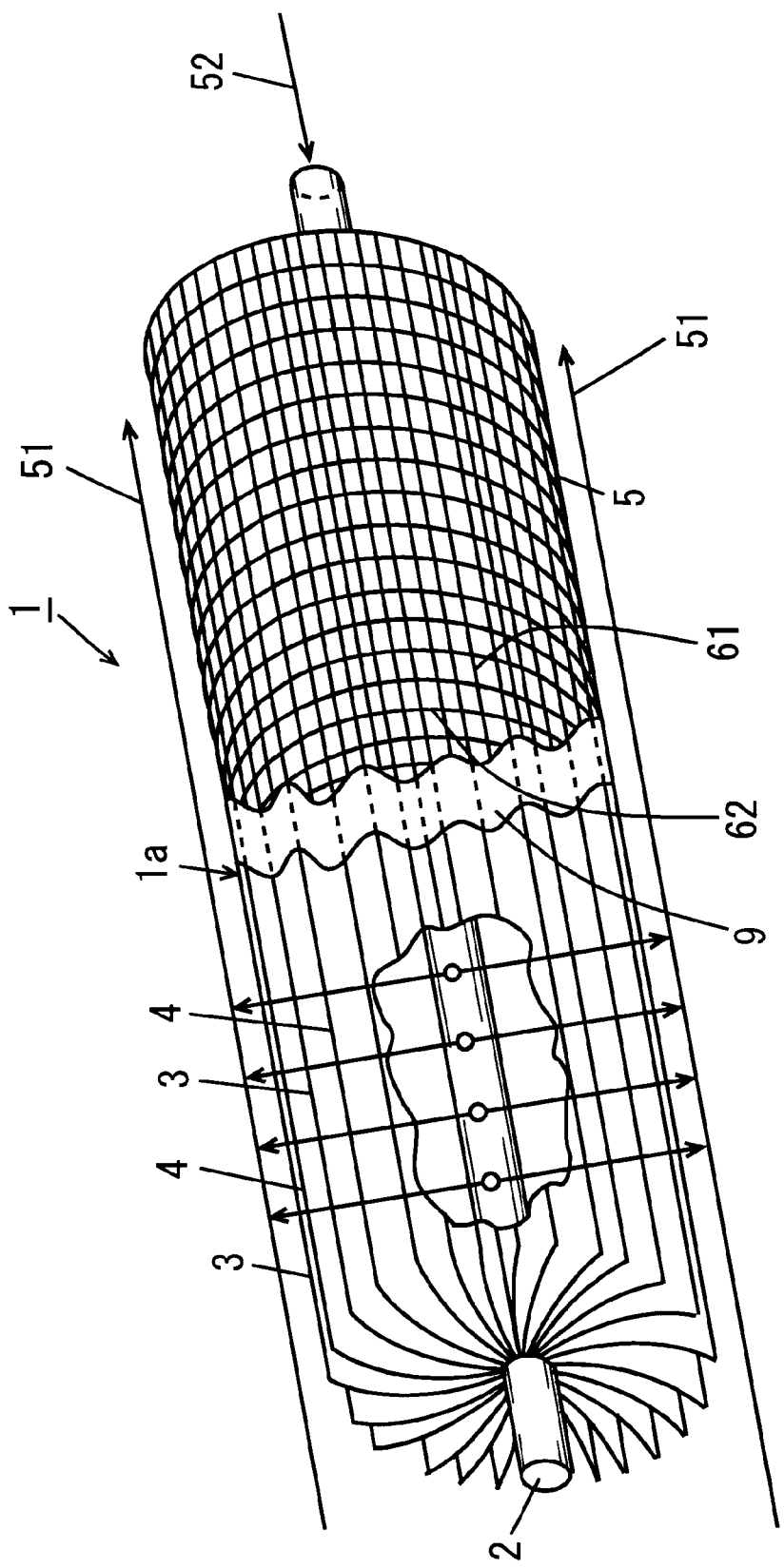
FIG. 5 is a partially fragmented perspective view showing back wash reverse filtration in the spiral wound type membrane element of FIG. 1.

After performing filtration for a constant period, back wash reverse filtration is performed with the permeate 52 from the permeation side. FIG. 5 is a partially fragmented perspective view showing washing in the spiral wound type membrane element 1 shown in FIG. 1. In washing, the valves 18a and 18c of the pipes 19 and 17 are closed and the valve 18b of the pipe 20 is opened for introducing the permeate 52 into the water collection pipe 2 from the permeate outlet 14 shown in FIG. 4 for performing back wash reverse filtration. At this time, the permeate 52 permeates through the envelope-like membranes 3 from the water collection pipe 2, separates contaminants adhering to the membrane surface, the raw water spacers 4 etc. and flows toward at least the outer peripheral portion along the raw water spacers 4. The permeate 52 readily separates contaminants captured on at least the outer peripheral portion of the spiral wound type membrane element 1. The separated contaminants are discharged from the raw water inlet 13 through the pipe 20 with the permeate 52. Thereafter flushing is performed with the raw water. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water 51 linearly flows axially along the outer peripheral passage forming member 5 for discharging the contaminants separated by back wash reverse filtration through the raw water outlet 15 and the pipe 17 shown in FIG. 4 while separating contaminants remaining on the membrane surface, the outer peripheral portion etc. of the spiral wound type membrane element 1 from the spiral wound type membrane element 1 and discharging the same. Consequently, the membrane flux is remarkably recovered as compared with that before the back wash reverse filtration. The permeate 52 discharged after back wash reveres filtration and raw water 54 discharged after flushing may be returned to a raw water tank storing the raw water, to be supplied as the raw water 51 again.

According to the aforementioned washing method, contaminants adhering to the membrane surface, the outer peripheral portion etc. of the spiral wound type membrane element 1, particularly those adhering to the separation membrane 9 can be readily and reliably discharged from the system along the outer peripheral passage forming member 5, whereby increase of the resistance of the separation membrane 9 can be suppressed. Thus, a stable permeate flow rate can be regularly maintained. Further, handleability is improved since the outer peripheral portion of the spiral wound type membrane element 1 is covered with the outer peripheral passage forming member 5.

Further, the clearance between the spiral wound type membrane element 1 and the pressure vessel 10 will not define a dead space due to the aforementioned filtration mode, not to allow resistance of the liquid (liquid residence). Thus, high reliability is attained with no problems such as propagation of germs such as microorganisms, occurrence of a bad smell resulting from decomposition of organic matter and decomposition of the separation membranes 7 and 9.

In addition, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

Further, it is not necessary to use a large pump for supplying the raw water 51 due to dead end filtration. Thus, the system cost is reduced.

While the permeate 52 is first introduced into the water collection pipe 2 for separating the contaminants captured on the membrane surface, the outer peripheral portion etc. of the spiral wound type membrane element 1 by back wash reverse filtration and then performing flushing with the raw water in the aforementioned washing, flushing may alternatively be performed with the raw water first for thereafter performing back wash reverse filtration. According to this washing method, most of the contaminants captured on the membrane surface, the outer peripheral portion etc. of the spiral wound type membrane element 1 are removed by flushing and those remaining on the membrane surface, the outer peripheral portion etc. of the spiral wound type membrane element 1 can be removed by back wash reverse filtration. Alternatively, flushing may be performed simultaneously with back wash reverse filtration. Also in this case, effects similar to the above can be attained.

Figure 6:
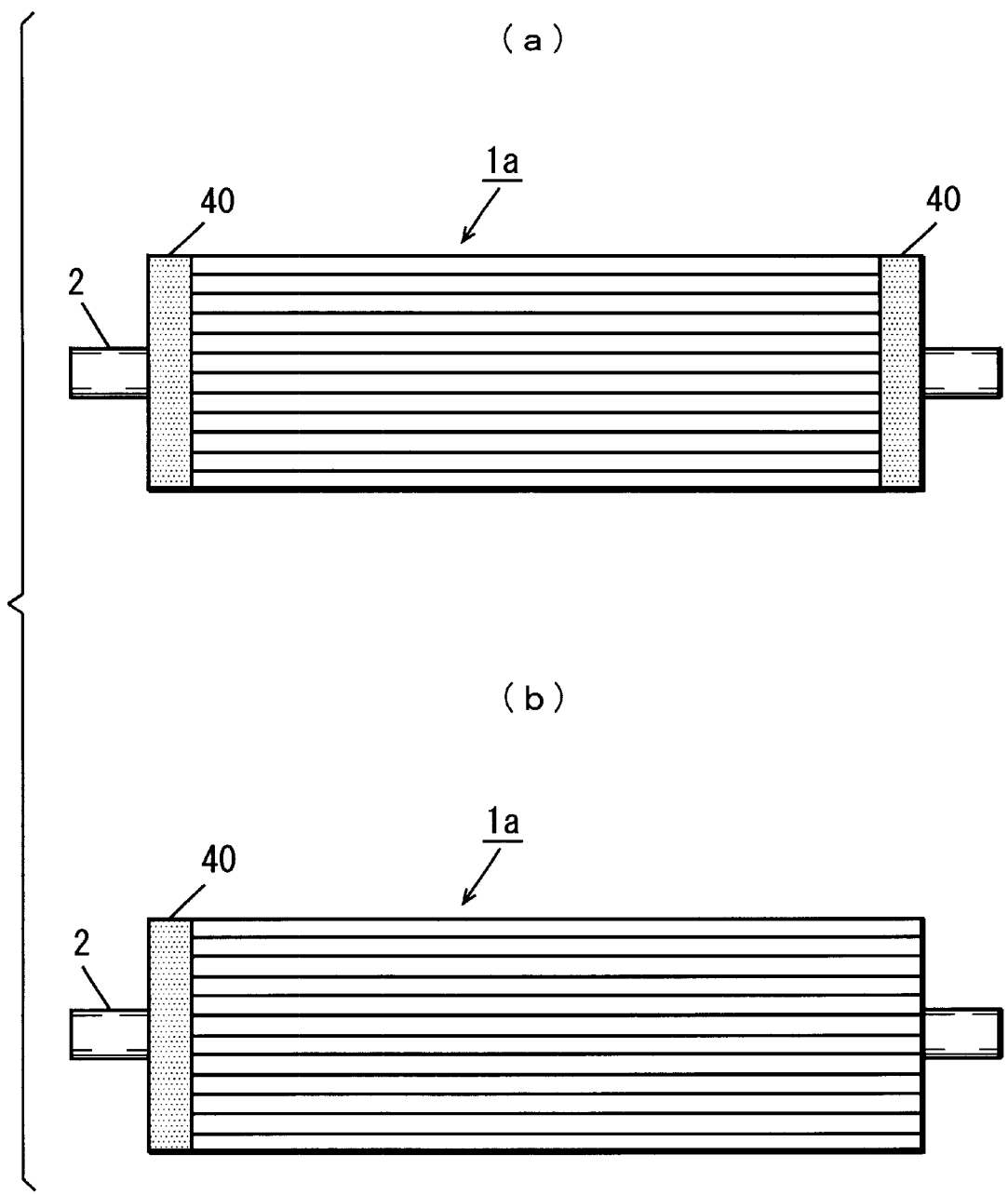
FIGS. 6(a) and 6(b) are front elevational views showing other exemplary spiral wound type membrane elements employed in the treatment system according to the present invention.

FIGS. 6(a) and 6(b) are front elevational views showing other exemplary spiral wound type membrane elements 1 employed in the treatment system according to the present invention. Referring to FIGS. 6(a) and 6(b), outer peripheral passage forming members are not shown.

In the spiral wound type membrane element 1 shown in FIG. 6(a), both ends of a spiral membrane component 1a are sealed with resin layers 40. In the spiral wound type membrane element 1 shown in FIG. 6(b), an end of a spiral membrane component 1a is sealed with a resin layer 40.

Each of the spiral wound type membrane elements 1 shown in FIGS. 6(a) and 6(b) requires no space for supplying raw water to both ends or one end of the spiral wound type membrane element 1, although the number of working steps in manufacturing is increased. Therefore, a pressure vessel can be miniaturized, thereby miniaturizing a spiral wound type membrane module formed by storing the spiral wound type membrane element 1 in the pressure vessel.

Further, it is possible to prevent the end surface of the spiral wound type membrane element 1 from contamination resulting from dynamic pressure of raw water when the raw water is introduced by arranging the end of the spiral wound type membrane element 1 sealed with the resin layer 40 on the side of a raw water inlet of the pressure vessel.

Figure 7:
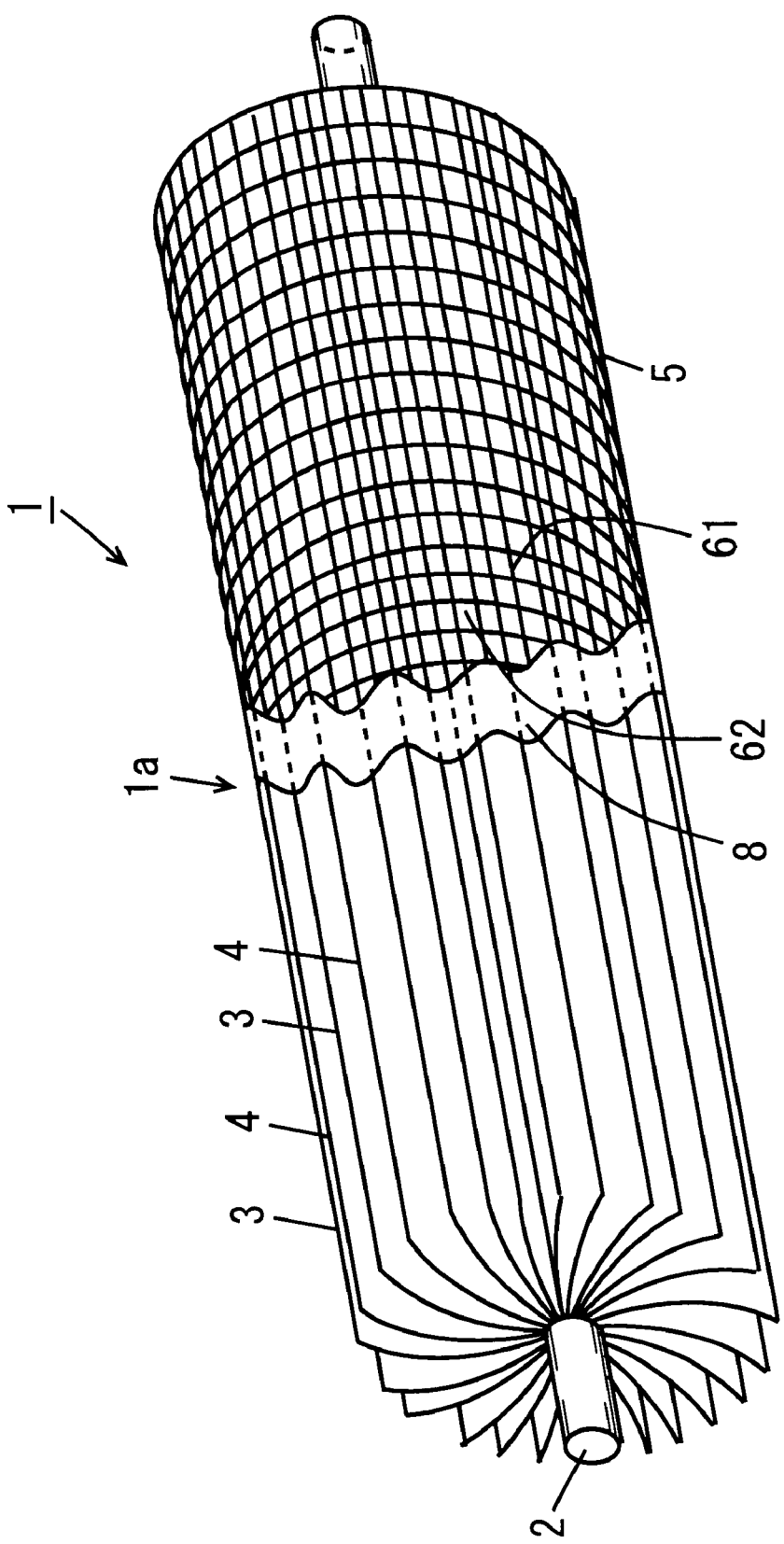
FIG. 7 is a partially fragmented perspective view showing a further exemplary spiral wound type membrane element employed in the treatment system according to the present invention.
Figure 8:
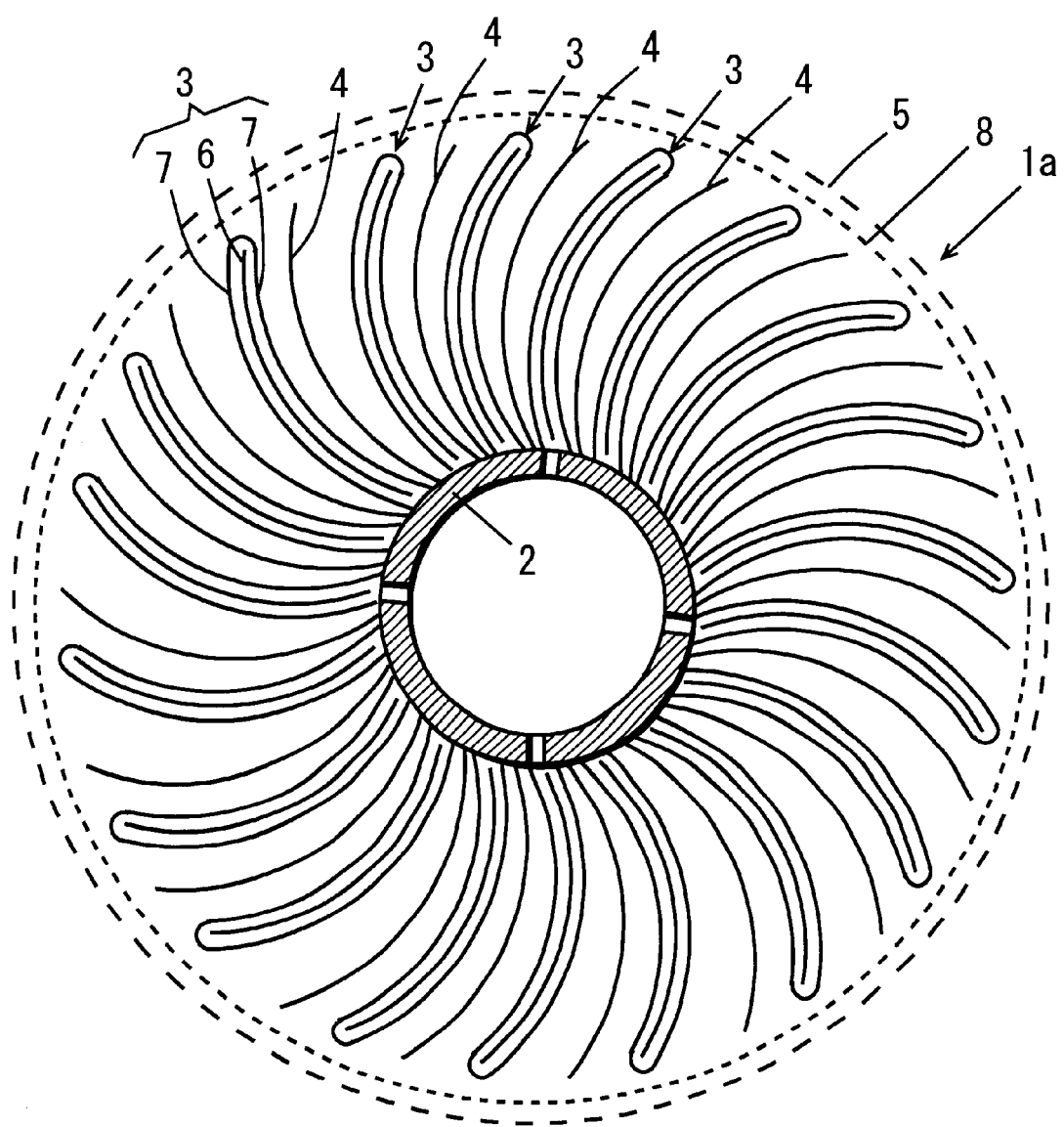
FIG. 8 is a cross-sectional view showing exemplary envelope-like membranes of the spiral wound type membrane element shown in FIG. 7.
Figure 9:
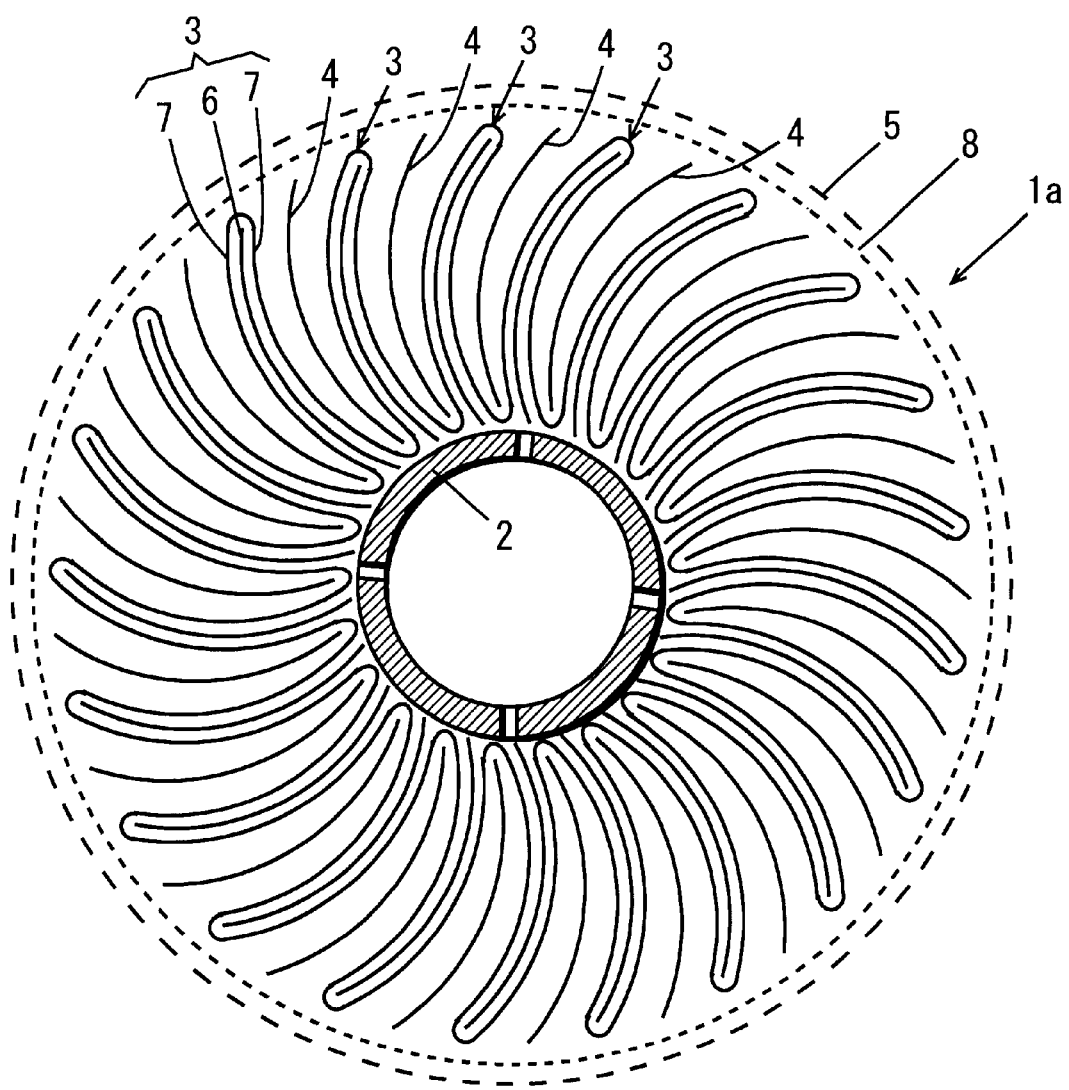
FIG. 9 is a cross-sectional view showing other exemplary envelope-like membranes of the spiral wound type membrane element shown in FIG. 7.
Figure 10:
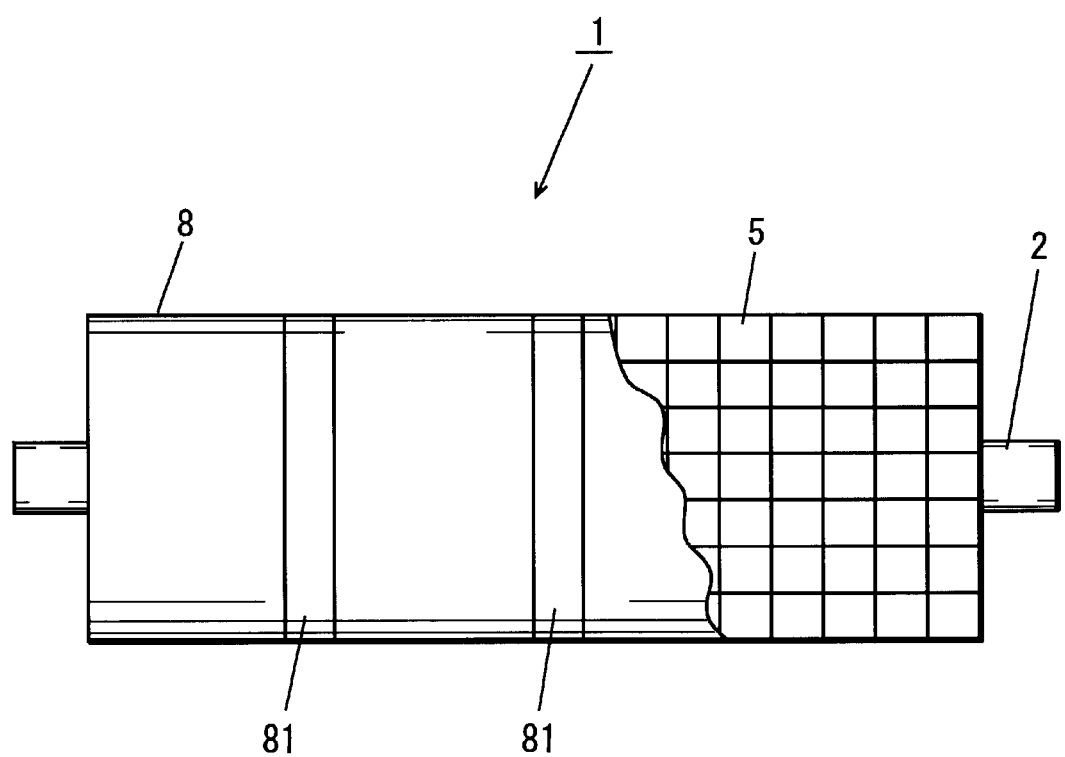
FIG. 10 is a partially fragmented front elevational view of the spiral wound type membrane element shown in FIG. 7.

FIG. 7 is a partially fragmented perspective view showing a further exemplary spiral wound type membrane element 1 employed in the treatment system according to the present invention. FIG. 8 is a cross-sectional view showing exemplary envelope-like membranes of the spiral wound type membrane element 1 shown in FIG. 7, and FIG. 9 is a cross-sectional view showing other exemplary envelope-like membranes of the spiral wound type membrane element 1 shown in FIG. 7. FIG. 10 is a partially fragmented front elevational view of the spiral wound type membrane element 1 shown in FIG. 7.

The spiral wound type membrane element 1 shown in FIG. 7 includes a spiral membrane component 1a formed by winding a plurality of independent envelope-like membranes 3 or a plurality of continuous envelope-like membranes 3 around the outer peripheral surface of a water collection pipe 2 formed by a perforated hollow pipe. Raw water spacers (raw liquid passage forming members) 4 are inserted between the envelope-like membranes 3 for preventing the envelope-like membranes 3 from coming into close contact with each other and reducing the membrane area and for forming a passage for raw water.

As shown in each of FIGS. 8 and 9, each envelope-like membrane 3 is formed by superposing two separation membranes 7 on both surfaces of a permeate spacer (permeate passage forming member) 6 and bonding three sides, and an opening part of the envelope-like membrane 3 is mounted on the outer peripheral surface of the water collection pipe 2. The separation membranes 7 are formed by low-pressure reverse osmosis membranes run at a rate of not more than 10 kgf/cm$^2$, ultrafiltration membranes or microfiltration membranes.

Referring to FIG. 8, the plurality of envelope-like membranes 3 are formed by independent separation membranes 7 respectively. Referring to FIG. 9, the plurality of envelope-like membranes 3 are formed by folding a continuous separation membrane 7.

The outer peripheral surface of the spiral membrane component 1a is covered with a net 8 made of a liquid-permeable material. The material for the net 8 can be prepared from synthetic resin such as polyolefine, polysulfone, polypropylene, polyester, polyethylene, polystyrene, polyacrylonitrile or polyamide, or metal such as stainless steel or iron.

The net 8 preferably has at least three meshes and not more than 200 meshes. Thus, the spiral membrane component 1a can be reliably inhibited from swelling resulting from back pressure in back wash reverse filtration, and raw water can be sufficiently supplied into the spiral membrane component 1a from the outer peripheral side in running.

In the spiral wound type membrane element 1 shown in FIG. 7, the material for the net 8 is prepared by impregnating tricot cloth with epoxy resin. This net 8 has 50 meshes, pitches of the warps and the wefts are 0.5 mm, and the diameters of the warps and the wefts are 0.15 mm.

The end surfaces of the spiral membrane component 1a may also be covered with the net 8, in addition to the outer peripheral surface.

As shown in FIG. 10, resin 81 is circumferentially applied to three portions of the net 8 covering the outer peripheral surface of the spiral membrane component 1a at regular intervals, thereby fixing the net 8 to the outer peripheral surface of the spiral membrane component 1a on the three portions. While the number of the portions for applying the resin 81 dependent on the back pressure caused in back wash reverse filtration is not particularly restricted, contaminants are hardly removed from the outer peripheral portion of the spiral membrane component 1a in back wash reverse filtration if the resin 81 is applied to four or more portions. Therefore, if the length of the spiral membrane component 1a is 944 cm, for example, it is preferable to fix the net 8 with the resin 81 on about three portions.

The outer peripheral surface of the net 8 is covered with an outer peripheral passage forming member 5. The material for and the size of the outer peripheral passage forming member 5 are similar to those of the outer peripheral passage forming member 5 shown in FIG. 1.

The net 8 covering the outer peripheral portion may be entirely or partially covered with the outer peripheral passage forming member 5.

The spiral wound type membrane module having the spiral wound type membrane element 1 shown in FIG. 7 is run by a running method similar to the method of running a spiral wound type membrane module shown in FIG. 4. In running of the spiral wound type membrane module, a valve 18a of a pipe 19 is opened and valves 18b and 18c of pipes 20 and 17 are closed. Raw water 51 is introduced into a pressure vessel 10 from a raw water inlet 13 thereof through the pipe 19. The raw water 51 flows along the outer peripheral passage forming member 5, and infiltrates into the clearances between the envelope-like membranes 3 from the outer peripheral side and both ends of the spiral wound type membrane element 1. Permeate permeating through the separation membranes 7 flows into a water collection pipe 2 along the permeate spacers 6. Thus, permeate 52 is taken out from a permeate outlet 14 of the pressure vessel 10. Dead end filtration is performed in such a manner.

In this case, the outer peripheral surface of the spiral membrane component 1a is covered with the net 8, whereby contaminants such as turbid substances larger than the pore size of the net 8 are captured on at least the outer peripheral portion of the spiral wound type membrane element 1. In other words, only contaminants smaller than the pore size of the net 8 infiltrate into the clearances between the envelope-like membranes 3. Thus, loads on the separation membranes 7 forming the envelope-like membranes 3 are reduced.

The valve 18c of the pipe 17 may be opened for taking out partial raw water 54 from the raw water outlet 15. In this case, a flow of the raw water can be formed on the outer peripheral portion of the spiral wound type membrane element 1. Thus, part of contaminants contained in the raw water can be discharged from the pressure vessel 10 while suppressing sedimentation of the contaminants. At least part of the taken-out raw water 54 may be circulated to be supplied as the raw water 51 again.

After performing filtration for a constant time, back wash reverse filtration and flushing are performed by a method similar to the washing method shown in FIG. 5.

Figure 11:
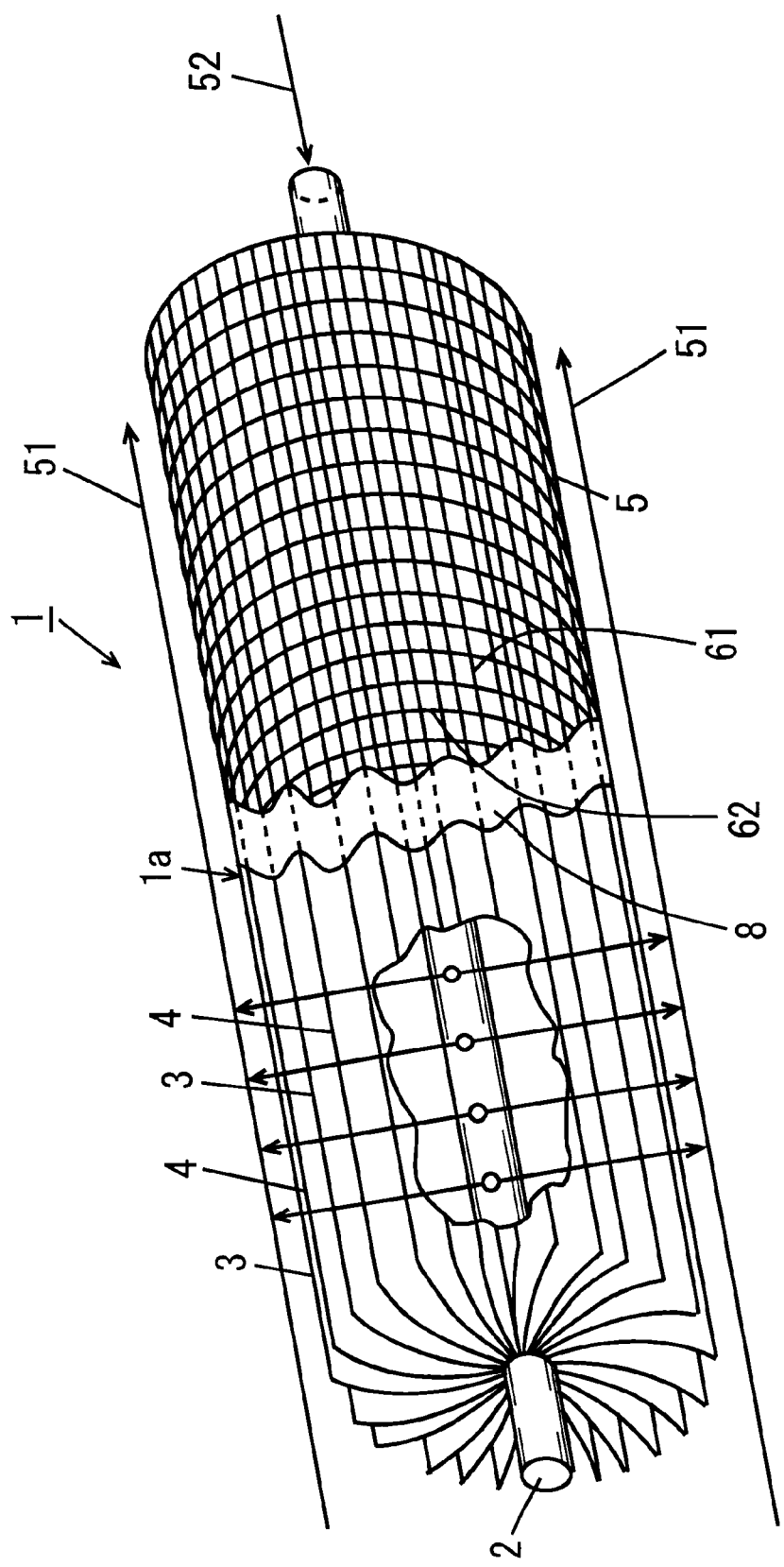
FIG. 11 is a partially fragmented perspective view showing back wash reverse filtration in the spiral wound type membrane element shown in FIG. 7.

FIG. 11 is a partially fragmented perspective view showing washing of the spiral wound type membrane element 1 shown in FIG. 7. Also in this example, the valves 18a and 18c of the pipes 19 and 17 are closed and the valve 18b of the pipe 20 is opened for introducing the permeate 52 into the water collection pipe 2 from the permeate outlet 14 in back wash reverse filtration, similarly to the example shown in FIG. 4. In this back wash reverse filtration, the permeate 52 permeates through the envelope-like membranes 3 from the water collection pipe 2, separates contaminants adhering to the membrane surface, the raw water spacers 4 etc. and flows toward at least the outer peripheral portion along the raw water spacers 4, as shown in FIG. 11. The permeate 52 readily separates contaminants captured on at least the outer peripheral portion of the spiral wound type membrane element 1. The separated contaminants are discharged through the raw water inlet 13 with the permeate 52. Thereafter flushing is performed with the raw water. The valve 18a of the pipe 19 is opened and the valve 18b of the pipe 20 is closed for opening the valve 18c of the pipe 17 while supplying the raw water 51 from the raw water inlet 13 through the pipe 19. Thus, the raw water linearly flows axially along the outer peripheral passage forming member 5 for discharging the contaminants separated by back wash reverse filtration through the raw water outlet 15 and the pipe 17 and separating contaminants remaining on the membrane surface, the outer peripheral portion etc. of the spiral wound type membrane element 1 from the spiral wound type membrane element 1. Consequently, the membrane flux is remarkably recovered as compared with that before washing. The permeate 52 discharged after back wash reverse filtration and raw water 54 discharged after flushing may be returned to a raw water tank storing the raw water, to be supplied as the raw water 51 again.

According to the aforementioned washing method, contaminants adhering to the membrane surface, the outer peripheral portion etc. of the spiral wound type membrane element 1, particularly to the net 8 can be readily and reliably discharged along the outer peripheral passage forming member 5, whereby increase of the resistance of the net 8 can be suppressed. Thus, a stable permeate flow rate can be regularly maintained. Further, handleability is improved since the outer peripheral portion of the spiral wound type membrane element 1 is covered with the outer peripheral passage forming member 5.

In the spiral wound type membrane element 1 shown in FIG. 7, the outer peripheral surface of the spiral membrane component 1a is covered with the net 8, whereby the spiral membrane component 1a is prevented from swelling by the net 8 covering the outer peripheral portion so that the clearances between the envelope-like membranes 3 are not enlarged even if back pressure caused in the back wash reverse filtration is increased by contaminants captured on the outer peripheral portion of the spiral membrane component 1a. Thus, the envelope-like membranes 3 are prevented from breakage caused by swelling, and the contaminants contained in the raw water 51 do not leak into the permeate 52.

In particular, the net 8 is fixed to the outer peripheral portion of the spiral membrane component 1a on a plurality of portions, whereby the spiral membrane component 1a is reliably prevented from swelling even if the back wash reverse filtration is performed under high back pressure.

In addition, no dead space is defined in the clearance between the spiral wound type membrane element 1 and the pressure vessel 10, whereby high reliability is attained with no problems such as propagation of germs such as microorganisms, occurrence of a bad smell resulting from decomposition of organic matter and decomposition of the separation membranes 7.

Further, pressure is applied to the spiral wound type membrane element 1 from all directions, whereby the spiral wound type membrane element 1 is not deformed and neither packing holders nor a protective sheath is required. Thus, the component cost and the manufacturing cost are reduced.

In addition, it is not necessary to employ a large pump for supplying the rawwater 51 due to dead end filtration. Thus, the system cost is reduced.

While flushing is performed with the raw water after back wash reverse filtration in the aforementioned washing, flushing may alternatively be performed first for thereafter performing back wash reverse filtration. According to this washing method, most of the contaminants captured on the membrane surface, the outer peripheral portion etc. of the spiral wound type membrane element 1 are removed by the flushing and contaminants remaining on the membrane surface, the outer peripheral portion etc. of the spiral wound type membrane element 1 can be removed by back wash reverse filtration. Alternatively, flushing may be performed simultaneously with back wash reverse filtration. Also in this case, effects similar to those of the aforementioned back wash reverse filtration can be attained.

Figure 12:
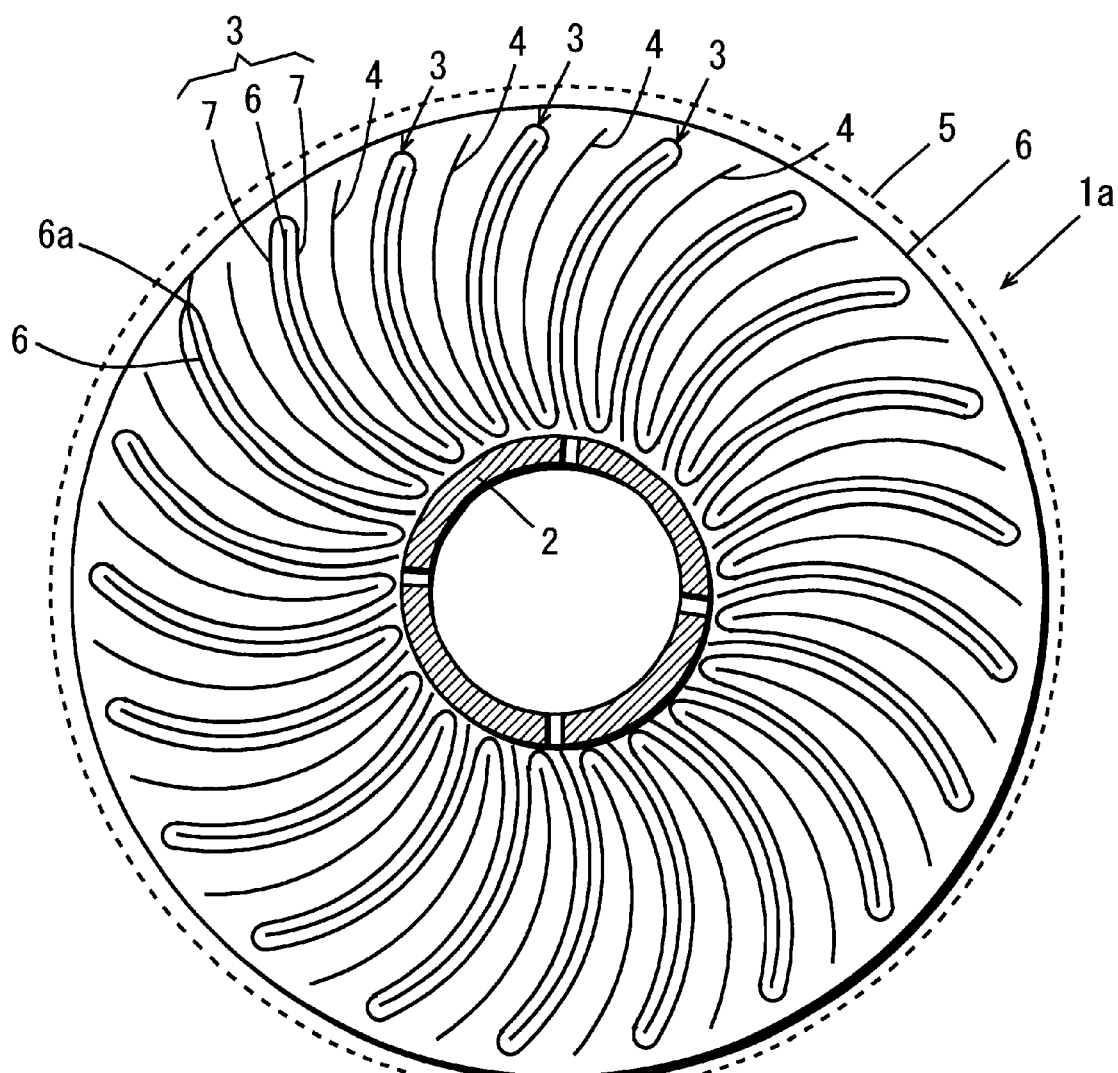
FIG. 12 is a cross-sectional view showing a permeate spacer employed as a net.

The spiral wound type membrane element employed in the treatment system according to the present invention may be formed by a spiral wound type membrane element 1 employing part of permeate spacers 6 as a net 8 as shown in FIG. 12. In such a spiral wound type membrane element 1, the permeate spacer 6 inserted in one envelope-like membrane 3 is extended to project outward from a side portion of the envelope-like membrane 3 closer to the outer peripheral portion and the extended part of the permeate spacer 6 is wound around the outer peripheral surface of a spiral membrane component 1a as the net 8. The clearance between the permeate spacer 6 projecting outward from the side portion of the envelope-like membrane 3 closer to the outer peripheral portion and the envelope-like membrane 3 is sealed with resin 6a.

In this case, the extended permeate spacer 6 can prevent the spiral membrane component 1a from swelling resulting from back pressure in back wash reverse filtration while suppressing an additional component cost for the net 8.

While the spiral wound type membrane module 100 shown in FIG. 4 is formed by charging the pressure vessel 10 with the single spiral wound type membrane element 1, the spiral wound type membrane module employed in the treatment system according to the present invention may alternatively be formed by charging a pressure vessel with a plurality of spiral wound type membrane elements.

Figure 13:
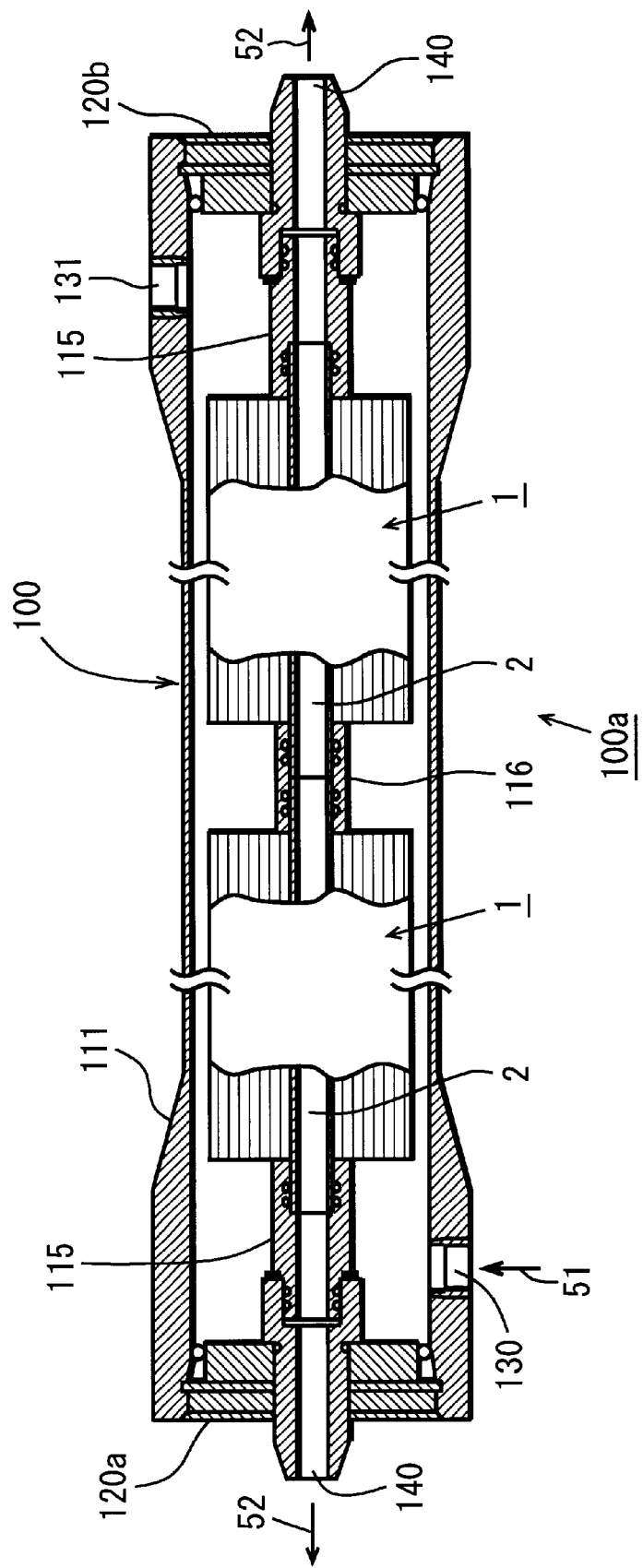
FIG. 13 is a sectional view showing another exemplary spiral wound type membrane module employed in the treatment system according to the present invention.

FIG. 13 is a sectional view showing another exemplary method of running the spiral wound type membrane module employed in the treatment system according to the present invention.

As shown in FIG. 13, a pressure vessel 110 is formed by a tubular case 111 and a pair of end plates 120a and 120b.

A raw water inlet 130 is formed on the bottom portion of the tubular case 111, and a raw water outlet 131 is formed on the upper portion. The raw water outlet 131 is also employed for deairing. Permeate outlets 140 are provided on the centers of the end plates 120a and 120b.

The tubular case 111 stores a plurality of spiral wound type membrane elements 1 having water collection pipes 2 serially coupled with each other by an interconnector 116, and both opening ends of the tubular case 111 are sealed with the end plates 120a and 120b respectively. Single ends of the water collection pipes 2 of the spiral wound type membrane elements 1 located on both ends are engaged with the permeate outlets 140 of the end plates 120a and 120b through adapters 115 respectively. Thus, a spiral wound type membrane module 100a is formed by charging the pressure vessel 110 with the plurality of spiral wound type membrane elements 1. Each spiral wound type membrane element 1 can be formed by the spiral wound type membrane element 1 shown in FIGS. 1, 6(a), 6(b), 7 or 12. In this case, the spiral wound type membrane element 1 shown in FIG. 1 is employed.

When running the spiral wound type membrane module 110a, the raw water outlet 131 is closed for introducing raw water 51 into the pressure vessel 110 from the raw water inlet 130 thereof, as shown in FIG. 13. The raw water 51 flows along the outer peripheral passage forming member 5 of each spiral wound type membrane element 1. In each spiral wound type membrane element 1, the raw water 51 permeates through the separation membrane 9 from at least the outer peripheral side and infiltrates into the clearances between the envelope-like membranes 3 along the raw water spacers 4, as shown in FIG. 1. Permeate permeating through the envelope-like membranes 3 flows into the water collection pipe 2 along the permeate spacers 6, and permeate 52 is taken out from the permeate outlets 140 provided on both ends of the pressure vessel 110. Thus, dead end filtration is performed.

After performing filtration for a constant time, back wash reverse filtration is performed with the permeate 52 from the permeation side. In back wash reverse filtration, the permeate 52 is introduced into the water collection pipe 2 of each spiral wound type membrane element 1 from the permeate outlets 140 provided on both ends of the pressure vessel 110. Thus, the permeate 52 separates contaminants adhering to the membrane surface, the raw water spacers 4 etc. of each spiral wound type membrane element 1 and flows toward at least the outer peripheral portion along the raw water spacers 4, as shown in FIG. 5. The permeate 52 readily separates contaminants captured on at least the outer peripheral portion of each spiral wound type membrane element 1. Thereafter the raw water outlet 131 is opened and the raw water 51 is supplied from the raw water outlet 130 for performing flushing, thereby discharging the contaminants separated by back wash reverse filtration from the spiral wound type membrane module 100a through the raw water outlet 131 with the raw water. Also in this case, flushing with the raw water may be performed before or in parallel with back wash reverse filtration, as described above with reference to FIG. 4.

According to the aforementioned method of running a spiral wound type membrane module, the raw water is supplied from at least the outer peripheral side of each spiral wound type membrane element 1 for performing dead end filtration in each spiral wound type membrane element 1, similarly to the example shown in FIG. 4. In this case, contaminants are captured on at least the outer peripheral portion in each spiral wound type membrane element 1.

Thus, loads on the separation membranes 7 forming the envelope-like membranes 3 are reduced.

In washing, contaminants adhering to the membrane surface, the raw water spacers 4, the outer peripheral portion etc. of each spiral wound type membrane element 1 can be readily discharged along the outer peripheral passage forming member 5, whereby a stable permeate flow rate can be maintained.

The spiral wound type membrane module 100a charged with the plurality of spiral wound type membrane elements 1 has a large capacity of treatment, and the permeate 52 can be efficiently obtained.

No dead space is defined in the clearance between each spiral wound type membrane element 1 and the pressure vessel 110 due to the aforementioned filtration mode, whereby high reliability is attained with no problems such as propagation of germs such as microorganisms, occurrence of a bad smell resulting from decomposition of the organic matter, decomposition of separation membranes and the like.

Further, pressure is applied to each spiral wound type membrane element 1 from all directions, whereby the spiral wound type membrane element 1 is not deformed and neither packing holders nor a sheath is required. Thus, the component cost and the manufacturing cost are reduced.

Further, it is not necessary to employ a large pump for supplying the raw water 51 due to dead end filtration. Thus, the system cost is reduced.

Also in the spiral wound type membrane module 100a formed by charging the pressure vessel 110 with the plurality of spiral wound type membrane elements 1, partial raw water may be taken out from the raw water outlet 131 for axially forming a flow of the raw water along the outer peripheral portion of each spiral wound type membrane element 1, as described above with reference to the example of FIG. 4. In this case, part of contaminants contained in the raw water can be discharged from the pressure vessel 110 while suppressing sedimentation of the contaminants, whereby a more stable permeate flow rate can be maintained.*

Treatment systems performing pretreatment with the aforementioned spiral wound type membrane module are now described. In the following description, the spiral wound type membrane module 100 shown in FIG. 4 is employed.

FIGS. 14(a) to 14(c) are model diagrams showing treatment systems 500, 501 and 502 according to an embodiment of the present invention.

In the treatment system 500 shown in FIG. 14(a), the spiral wound type membrane module 100 is provided on a preceding stage of a reverse osmosis membrane separation device 300. In this case, the permeate outlet 14 (see FIG. 4) of the spiral wound type membrane module 100 is connected to a raw water inlet of the reverse osmosis membrane separation device 300 through a pipe 101. The reverse osmosis membrane separation device 300 is formed by a spiral wound type reverse osmosis membrane module, for example.

In the treatment system 500, raw water is supplied to the spiral wound type membrane module 100 from the raw water inlet 13 (see FIG. 4) of the spiral wound type membrane module 100 for performing dead end filtration as described above with reference to FIG. 4. Thus, pretreatment is performed in the spiral wound type membrane module 100 for removing contaminants from the raw water. Permeate (pretreated water) obtained from the permeate outlet 14 of the spiral wound type membrane module 100 is supplied into the reverse osmosis membrane separation device 300 from the raw water inlet thereof through the pipe 101. The permeate supplied from the spiral wound type membrane module 100 is separated into concentrate and permeate in the reverse osmosis membrane separation device 300 and taken out from the reverse osmosis membrane separation device 300.

In the treatment system 500, the raw water can be subjected to dead end filtration in the spiral wound type membrane module 100, whereby a pump for supplying the raw water to the spiral wound type membrane module 100 may not have a large size. Further, the permeate can be directly supplied from the spiral wound type membrane module 100 to the reverse osmosis membrane separation device 300 with the pressure of the pump. Thus, neither a pump nor a reservoir is required for supplying the permeate from the spiral wound type membrane module 100 to the reverse osmosis membrane separation device 300, whereby the system cost is reduced and the system is miniaturized.

In this case, pressure is applied to the spiral wound type membrane element 1 of the spiral wound type membrane module 100 from all directions, whereby the spiral wound type membrane element 1 is not deformed even if the raw liquid is supplied under high pressure, and high pressure resistance is attained. Thus, the raw water can be supplied with high pressure by the pump supplying the raw water to the spiral wound type membrane module 100.

Further, the spiral wound type membrane module 100 performs pretreatment, whereby the quality of the permeate is not varied with the quality of the raw water dissimilarly to the coagulation.precipitation.sand filtration method. Therefore, the reverse osmosis membrane separation device 300 can be regularly supplied with pretreated water having stable quality, and the ability thereof is not reduced. Thus, the treatment system 500 can be implemented with high reliability.

As hereinabove described, the spiral wound type membrane module 100 can be stably run with high reliability, whereby the quality of the pretreated water can be stably maintained over a long period by employing the spiral wound type membrane module 100.

Figure 14:
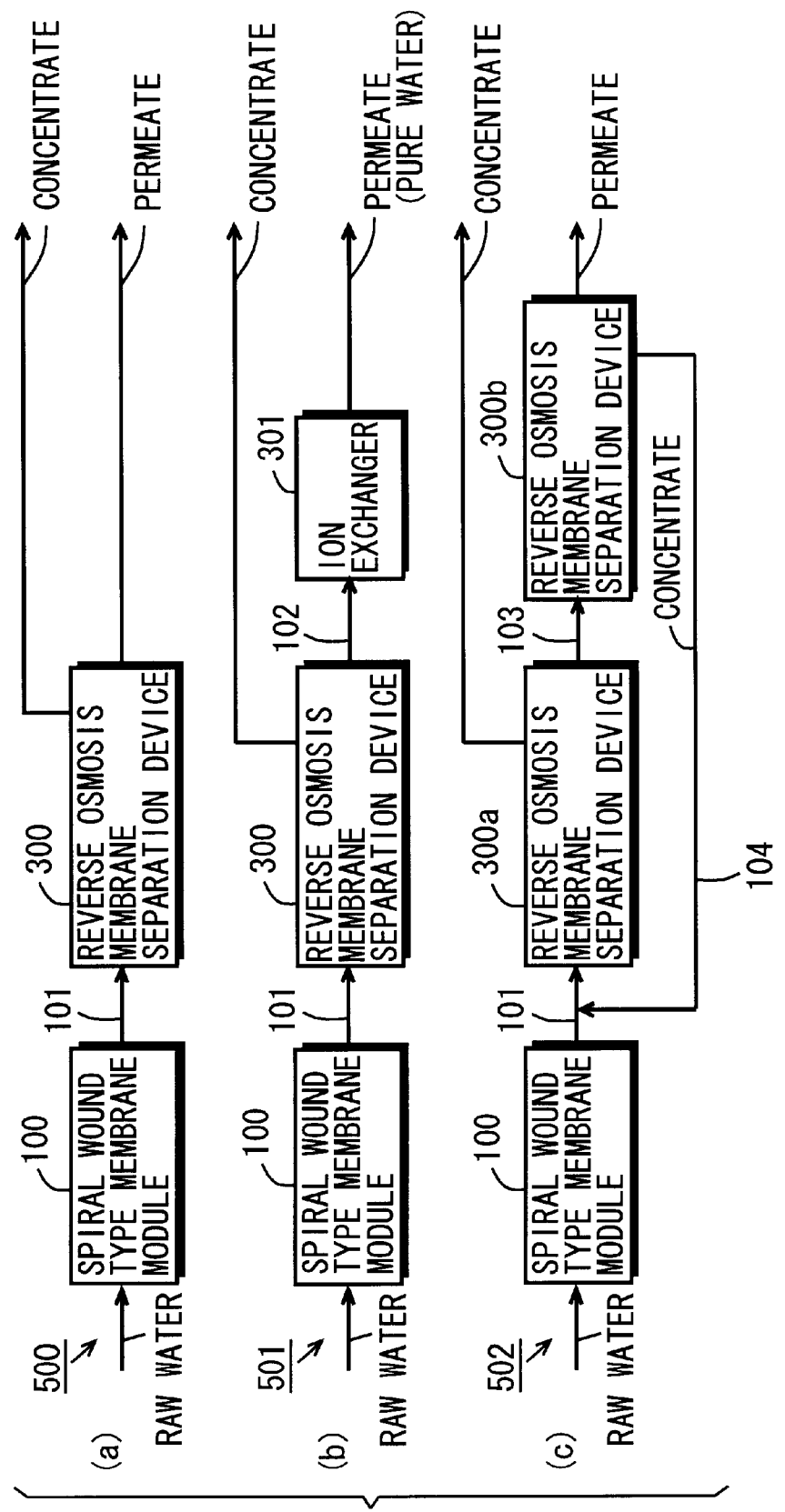
FIGS. 14(a) to 14(c) are model diagrams showing treatment systems according to an embodiment of the present invention.

The treatment system 501 shown in FIG. 14(*b*) is similar in structure to the treatment system 500 shown in FIG. 14(*a*) except a point that an ion exchanger 301 is further provided on a succeeding stage of a reverse osmosis membrane separation device 300 and a permeate outlet of the reverse osmosis membrane separation device 300 is connected to a raw water inlet of the ion exchanger 301 through a pipe 102. In this case, permeate discharged from the reverse osmosis membrane separation device 300 is further supplied to the ion exchanger 301 through the pipe 102, to be treated therein.

Also in the treatment system 501, effects similar to those described above with reference to the treatment system 500 can be attained. Further, permeate (pure water) having higher quality can be obtained due to treatment with the ion exchanger 301.

In the treatment system 502 shown in FIG. 14(*c*), a reverse osmosis membrane separation device 300*a* is provided on a succeeding stage of the spiral wound type membrane module 100, and another reverse osmosis membrane separation device 300*b* is further provided on a succeeding stage of the reverse osmosis membrane separation device 300*a*. The permeate outlet 14 of the spiral wound type membrane module 100 is connected to a raw water inlet of the reverse osmosis membrane separation device 300*a* through a pipe 101, and a permeate outlet of the reverse osmosis membrane separation device 300*a* is connected to a raw water inlet of the reverse osmosis membrane separation device 300*b* through a pipe 103. A concentrate outlet of the reverse osmosis membrane separation device 300*b* is connected to the raw water inlet of the reverse osmosis membrane separation device 300*a* through a pipe 104.

In this case, the spiral wound type membrane module 100 performs dead end filtration of raw water as pretreatment, as described above with reference to the treatment system 500. Permeate (pretreated water) discharged from the spiral wound type membrane module 100 is supplied to the reverse osmosis membrane separation device 300*a* through the pipe 101. The reverse osmosis membrane separation device 300*a* separates the pretreated water into concentrate and permeate, and the concentrate is taken out from the concentrate outlet. The permeate is temporarily taken out from the permeate outlet of the reverse osmosis membrane separation device 300*a* through the pipe 103, and supplied into the reverse osmosis membrane separation device 300*b* from the raw water inlet thereof. The reverse osmosis membrane separation device 300*b* further separates the permeate supplied from the reverse osmosis membrane separation device 300*a* into concentrate and permeate. This permeate is taken out from a permeate outlet thereof as treated water. The concentrate is temporarily taken out from the concentrate outlet of the reverse osmosis membrane separation device 300*b* through the pipe 104 and supplied into the reverse osmosis membrane separation device 300*a* from the raw water inlet thereof again, to be treated.

Also in the treatment system 502, effects similar to those described above with reference to the treatment system 500 can be attained. In this case, further, the permeate from the preceding stage reverse osmosis membrane separation device 300*a* is supplied to the succeeding stage reverse osmosis membrane separation device 300*b* and the concentrate taken out from the reverse osmosis membrane separation device 300*b* is supplied to the reverse osmosis membrane separation device 300*a* again, whereby permeate having high quality can be obtained with high recovery.

In each of the aforementioned treatment systems 500 to 502, partial raw water may be taken out from the spiral wound type membrane module 100 to be circulated to the supply side, as described above with reference to FIG. 4.

In each of the aforementioned treatment systems 500 to 502, a pretreater may be further provided on the preceding stage of the spiral wound type membrane module 100. Such cases are now described.

Figure 15:
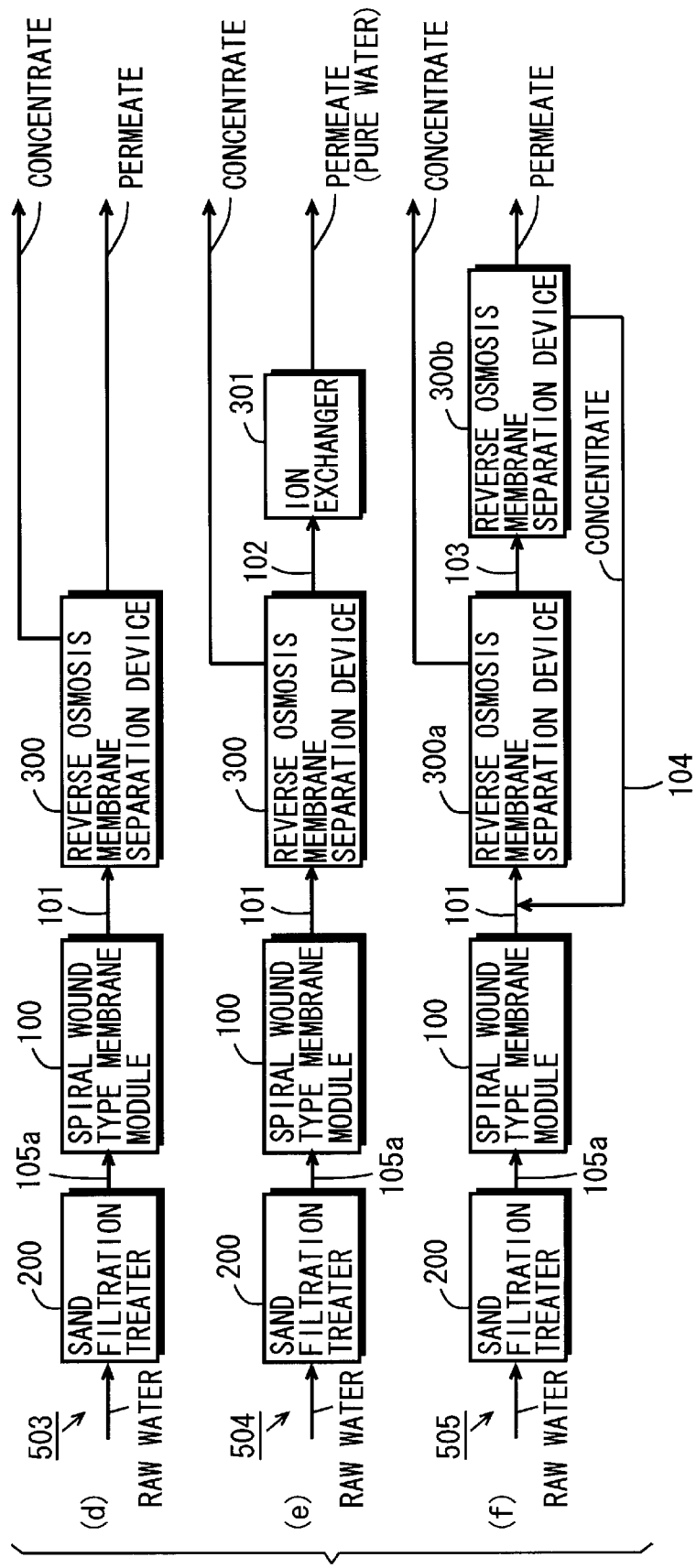
FIGS. 15(d) to 15(f) are model diagrams showing treatment systems according to another embodiment of the present invention.
Figure 16:
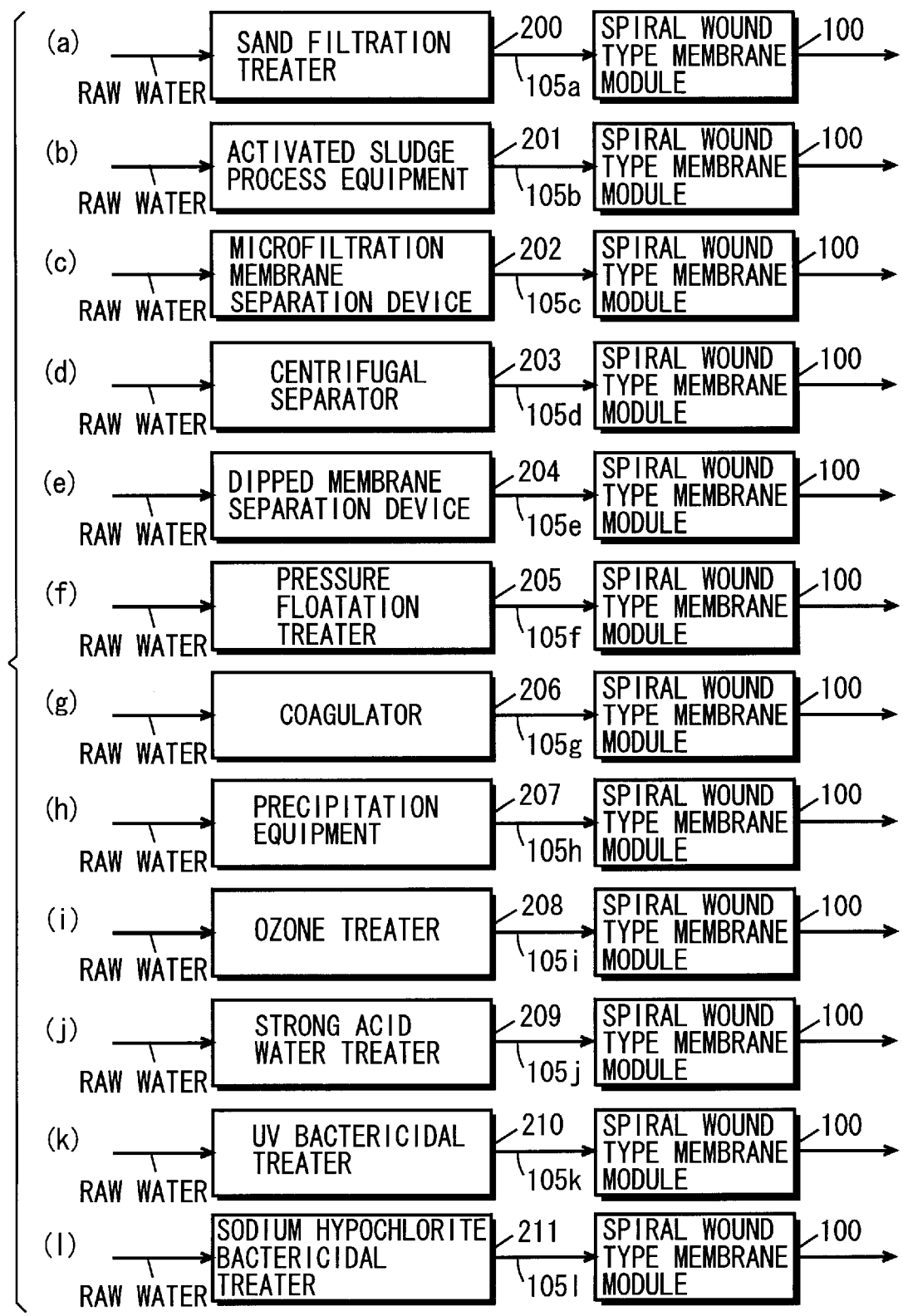
FIGS. 16(a) to 16(l) are model diagrams showing treatment systems according to still another embodiment of the present invention.

FIGS. 15(*d*) to 15(*f*) are model diagrams showing treatment systems 503 to 505 according to another embodiment of the present invention.

In each of the treatment systems 503 to 505 shown in FIGS. 15(*d*) to 15(*f*), a sand filtration treater 200 is further provided on the preceding stage of the spiral wound type membrane module 100 of each of the treatment systems 500 to 502 shown in FIGS. 14(*a*) to 14(*c*). In this case, the raw water inlet 13 (see FIG. 4) of the spiral wound type membrane module 100 is connected to the sand filtration treater 200 through a pipe 105*a*.

As shown in each of FIGS. 15(*d*) to 15(*f*), the sand filtration treater 200 is supplied with raw water and performs pretreatment in each of the treatment systems 503 to 505. Permeate discharged from the sand filtration treater 200 is supplied into the spiral wound type membrane module 100 from the raw water inlet 13 thereof through the pipe 105a, to be subjected to dead end filtration. In each of the treatment systems 503 to 505, the sand filtration treater 200 and the spiral wound type membrane module 100 successively perform pretreatment and the permeate discharged from the spiral wound type membrane module 100 is supplied to the reverse osmosis membrane separation device 300 or 300a through the pipe 101. In each of the treatment systems 503 to 505, the pretreated water supplied to the reverse osmosis membrane separation device 300 or 300a is treated by the treatment method described above with reference to each of the treatment systems 505 to 502.

Also in the aforementioned treatment systems 503 to 505, effects similar to those described above with reference to the treatment systems 500 to 502 can be attained. In each of the treatment systems 503 to 505, further, the sand filtration treater 200 provided on the preceding stage of the spiral wound type membrane module 100 previously pretreats the raw water and supplies the treated liquid to the spiral wound type membrane module 100. Thus, a load on the spiral wound type membrane element 1 of the spiral wound type membrane module 100 is reduced, and more stable running can be performed over a long period. Thus, the treatment systems 503 to 505 can be stably run with high reliability.

Also in each of the aforementioned treatment systems 503 to 505, partial raw water may be taken out from the spiral wound type membrane module 100 to be circulated to the supply side.

While the sand filtration treater 200 performs pretreatment for the spiral wound type membrane module 100 in each of the treatment systems 503 to 505 shown in FIGS. 15(d) to 15(f), an element other than the sand filtration treater 200 may alternatively perform pretreatment.

FIGS. 16(a) to 16(l) illustrate exemplary pretreatment for the spiral wound type membrane module 100.

FIG. 16(a) illustrates the sand filtration treater 200 employed in the aforementioned treatment systems 503 to 505. In this case, the sand filtration treater 200 removes contaminants from raw water.

In place of the sand filtration treater 200 shown in FIG. 16(a), activated sludge process equipment 201 may perform pretreatment as shown in FIG. 16(b). In this case, microorganisms stored in the activated sludge process equipment 201 decompose contaminants and remove the same from raw water. Permeate (pretreated water) discharged from the activated sludge process equipment 201 is supplied to the spiral wound type membrane module 100 through a pipe 105b.

As shown in FIG. 16(c), a microfiltration membrane separation device 202 may perform pretreatment. In this case, a microfiltration membrane removes contaminants from raw water. Permeate (pretreated water) discharged from the microfiltration membrane separation device 202 is supplied to the spiral wound type membrane module 100 through a pipe 105c.

As shown in FIG. 16(d), a centrifugal separator 203 may perform pretreatment. In this case, it is possible to sediment contaminants contained in raw water and remove the same by centrifugation. Pretreated water discharged from the centrifugal separator 203 is supplied to the spiral wound type membrane module 100 through a pipe 105d.

As shown in FIG. 16(e), a dipped membrane separation device 204 may perform pretreatment. In this case, a dipped membrane removes contaminants from raw water. Permeate (pretreated water) discharged from the dipped membrane separation device 204 is supplied to the spiral wound type membrane module 100 through a pipe 105e.

As shown in FIG. 16(f), a pressure floatation treater 205 may perform pretreatment. In this case, the pressure floatation treater 205 floats contaminants contained in raw water by air bubbling with compressed air, for removing the floated contaminants. Pretreated water discharged from the pressure floatation treater 205 is supplied to the spiral wound type membrane module 100 through a pipe 105f.

As shown in FIG. 16(g), a coagulator 206 may perform pretreatment. In this case, the coagulator 206 coagulates contaminants contained in raw water for removing sedimenting contaminants. Pretreated water discharged from the coagulator 206 is supplied to the spiral wound type membrane module 100 through a pipe 105g.

As shown in FIG. 16(h), precipitation equipment 207 may perform. pretreatment. In this case, the precipitation equipment 207 sediments contaminants contained in raw water for removing the same. Pretreated water discharged from the precipitation equipment 207 is supplied to the spiral wound type membrane module 100 through a pipe 105h.

As shown in FIG. 16(i), an ozone treater 208 may perform pretreatment. In this case, it is possible to suppress propagation of germs in raw water by sterilizing the raw water with ozone. Pretreated water discharged from the ozone treater 208 is supplied to the spiral wound type membrane module 100 through a pipe 105i.

As shown in FIG. 16(j), a strong acid water treater 209 may perform pretreatment. In this case, it is possible to suppress propagation of germs in raw water by sterilizing the raw water with strong acid ion water. The strong acid ion water is acid water of about pH 2.5 obtained by electrolyzing salt water of several %. Pretreated water discharged from the strong acid water treater 209 is supplied to the spiral wound type membrane module 100 through a pipe 105j.

As shown in FIG. 16(k), an ultraviolet (UV) bactericidal treater 210 may perform pretreatment. In this case, it is possible to suppress propagation of germs in raw water by sterilizing the raw water with ultraviolet rays (UV). Pretreated water discharged from the ultraviolet bactericidal treater 210 is supplied to the spiral wound type membrane module 100 through a pipe 105k.

As shown in FIG. 16(l), a sodium hypochlorite bactericidal treater 211 may perform pretreatment. In this case, it is possible to suppress propagation of germs in raw water by sterilizing the raw water with sodium hypochlorite. Preferable free chlorine concentration is 0.1 ppm to 1000 ppm. Pretreated water discharged from the sodium hypochlorite bactericidal treater 211 is supplied to the spiral wound type membrane module 100 through a pipe 105l.

While each of the treatment systems 500 to 505 shown in FIGS. 14(a) to 16(l) employs the spiral wound type membrane module 100 for pretreatment, the spiral wound type membrane module 100 may alternatively be employed for treatment other than pretreatment. Such cases are now described.

Figure 17:
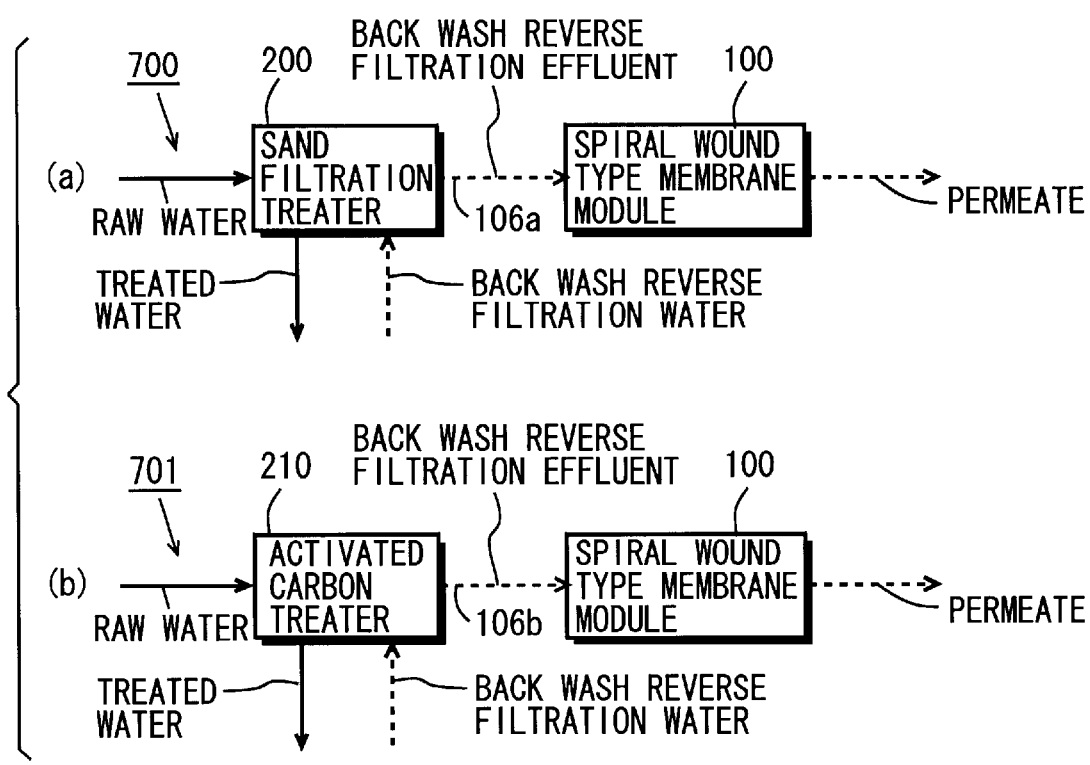
FIGS. 17(a) and 17(b) are model diagrams showing treatment systems according to a further embodiment of the present invention.
Figure 18:
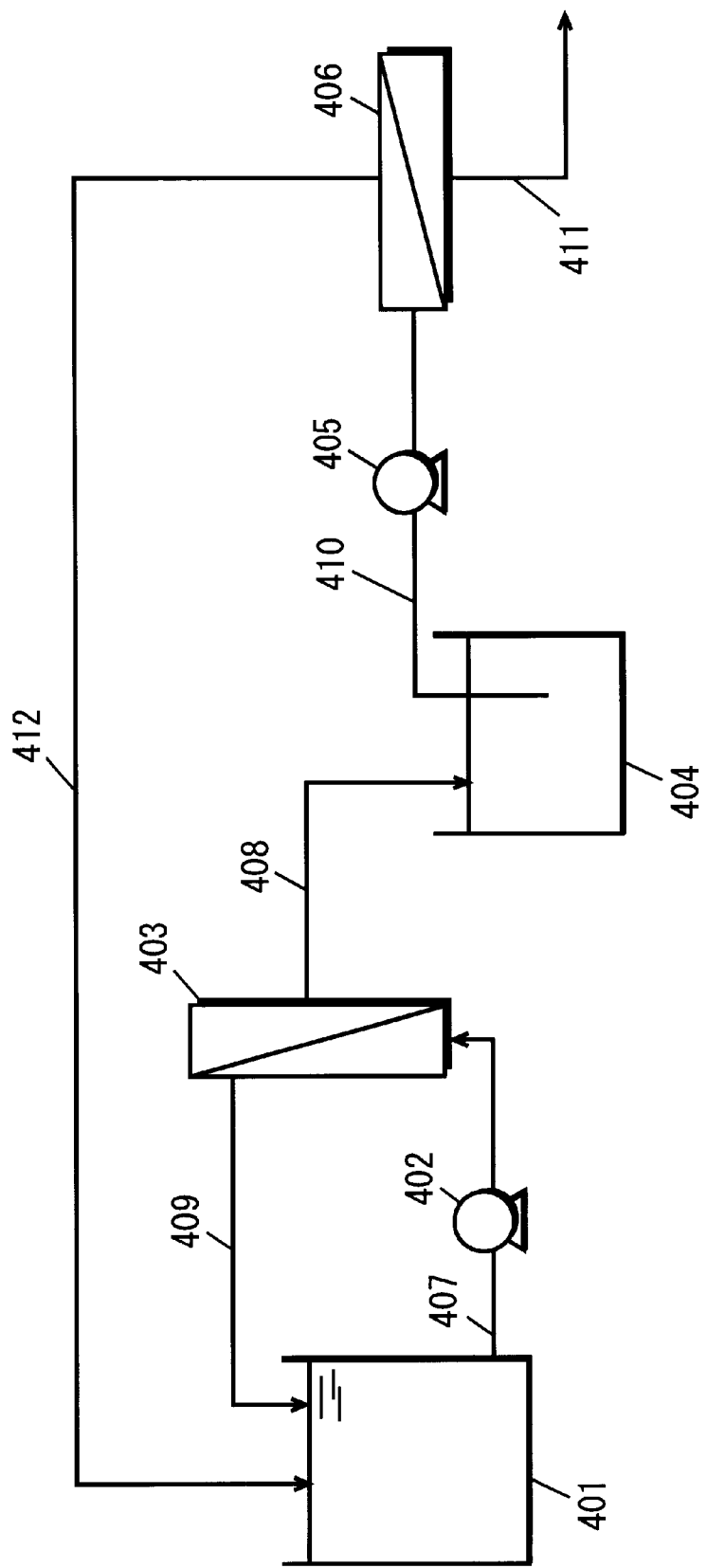
FIG. 18 illustrates an exemplary conventional treatment system.

FIGS. 17(a) and 17(b) are model diagrams showing treatment systems 700 and 701 according to still another embodiment of the present invention. Each of the treatment systems 700 and 701 shown in FIGS. 17(a) and 17(b) employs the spiral wound type membrane module 100 for effluent treatment.

In the treatment system 700 shown in FIG. 17(a), a wash water outlet of a sand filtration treater 200 is connected to the raw water inlet 13 (see FIG. 4) of the spiral wound type membrane module 100 through a pipe 106a. In this case, the sand filtration treater 200 pretreats raw water. The water treated in the sand filtration treater 200 is supplied to a reverse osmosis membrane separation device, for example, as treated water.

The treatment system 700 is run for a prescribed time and thereafter performs washing. The sand filtration treater 200 is washed by back wash reverse filtration.

Wash water employed for back wash reverse filtration of the sand filtration treater 200 is taken out from the wash water outlet of the sand filtration treater 200 through the pipe 106a and thereafter supplied into the spiral wound type membrane module 100 from the raw water inlet thereof. This wash water is subjected to dead end filtration in the spiral wound type membrane module 100, so that contaminants are removed from the same. Back wash reverse filtration effluent, from which the contaminants are removed by the spiral wound type membrane module 100, discharged from the sand filtration treater 200 is employed as wash water or cooling water, for example.

In the treatment system 700, the spiral wound type membrane module 100 treats the back wash reverse filtration effluent discharged from the sand filtration treater 200 as described above, whereby the back wash reverse filtration effluent discharged from the sand filtration treater 200 can be effectively reused.

The spiral wound type membrane module 100 can alternatively treat wash effluent discharged from a pretreater other than the sand filtration treater 200.

In the treatment system 701 shown in FIG. 17(b), for example, the spiral wound type membrane module 100 treats back wash reverse filtration effluent from an activated carbon treater 210. In this case, a wash water outlet of the activated carbon treater 210 is connected to the raw water inlet of the spiral wound type membrane module 100 through a pipe 106b for supplying back wash reverse filtration effluent from the activated carbon treater 210 to the spiral wound type membrane module 100 through the pipe 106b. Also in this treatment system 701, effects similar to those of the treatment system 700 can be attained.

Also in each of the aforementioned treatment systems 700 and 701, partial raw water may be taken out from the spiral wound type membrane module 100 to be circulated to the supply side, as described above with reference to FIG. 4.

While the spiral wound type membrane module 100 shown in FIG. 4 is employed in each of the treatment systems shown in FIGS. 14(a) to 17(b), the spiral wound type membrane module employed in the treatment system according to the present invention is not restricted to this. For example, the spiral wound type membrane module 100a shown in FIG. 13 may alternatively be employed. Also in this case, effects similar to those in the examples shown in FIGS. 14(a) to 17(b) can be attained.

While the invention has been described in detail, the foregoing description is in all aspects illustrative and not restrictive. It is understood that numerous other modifications and variations can be devised without departing from the scope of the invention.

What is claimed is:

1. A treatment system comprising:
   a spiral wound membrane module including a pressure vessel having a raw liquid inlet and one or a plurality of spiral wound membrane elements stored in said pressure vessel, wherein the spiral wound membrane element is disposed in the pressure vessel to allow raw liquid to flow through a space provided between an outermost peripheral surface of the spiral wound membrane element and the pressure vessel;
   one or a plurality of reverse osmosis membrane separation devices, provided on a succeeding stage of said spiral wound membrane module, including reverse osmosis membranes; and
   a first duct, wherein
   said spiral wound membrane element includes:
   a spiral membrane component including a perforated hollow pipe, a plurality of independent or continuous envelope membranes wound around the outer peripheral surface of said perforated hollow pipe and a raw liquid passage forming member interposed between said plurality of envelope membranes,
   a liquid-permeable material covering the outer peripheral portion of said spiral membrane component, and
   an outer peripheral passage forming member entirely or partially covering the outer peripheral surface of said liquid-permeable material,
   said raw liquid passage forming member is arranged to supply a raw liquid, supplied into said pressure vessel through said raw liquid inlet, into said perforated hollow pipe from at least the outer peripheral side of said spiral wound membrane element, and
   said first duct is provided to supply a permeated liquid taken out from at least one opening end of said perforated hollow pipe to said one or a plurality of reverse osmosis membrane separation devices.

2. The treatment system according to claim 1, wherein
   said one or a plurality of reverse osmosis membrane separation devices include a plurality of serially connected reverse osmosis membrane separation devices, and said first duct is provided to supply said permeated liquid to preceding stage said reverse osmosis membrane separation device among said plurality of serially connected reverse osmosis membrane separation devices,
   said treatment system further comprising:
   a second duct supplying said permeated liquid from said preceding stage reverse osmosis membrane separation device to succeeding stage said reverse osmosis membrane separation device, and
   a third duct returning a concentrated liquid from said succeeding stage reverse osmosis membrane separation device to the supply side of said preceding stage reverse osmosis membrane separation device.

3. The treatment system according to claim 1, further comprising an ion exchanger provided on a succeeding stage of said one or a plurality of reverse osmosis membrane separation devices for treating said permeated liquid from said one or a plurality of reverse osmosis membrane separation devices.

4. The treatment system according to claim 1, further comprising one or a plurality of pretreaters provided on a preceding stage of said spiral wound membrane module for performing prescribed pretreatment of said raw liquid supplied to said spiral wound membrane module.

5. The treatment system according to claim 4, wherein
   said pretreater includes at least one of a sand filtration treater, activated sludge process equipment, a microfiltration membrane separation device, a centrifugal separator, a dipped membrane separation device, a pressure floatation treater, a coagulator, precipitation equipment, an ozone treater, a strong acid water treater, an ultraviolet bactericidal treater and a sodium hypochlorite bactericidal treater.

6. A treatment system comprising:
   one or a plurality of pretreaters performing prescribed pretreatment;

a spiral wound membrane module, provided on a succeeding stage of said pretreaters, including a pressure vessel having a raw liquid inlet and one or a plurality of spiral wound membrane elements stored in said pressure vessel, wherein the spiral wound membrane element is disposed in the pressure vessel to allow raw liquid to flow through a space provided between an outermost peripheral surface of the spiral wound membrane element and the pressure vessel; and a duct, wherein said spiral wound membrane element includes:

a spiral membrane component including a perforated hollow pipe, a plurality of independent or continuous envelope membranes wound around the outer peripheral surface of said perforated hollow pipe and a raw liquid passage forming member interposed between said plurality of envelope membranes, a liquid-permeable material covering the outer peripheral portion of said spiral membrane component, and an outer peripheral passage forming member entirely or partially covering the outer peripheral surface of said liquid-permeable material, said duct is provided to supply a treated liquid discharged from said one or a plurality of pretreaters into said pressure vessel through said raw liquid inlet, and said raw liquid passage forming member is arranged to supply said treated liquid, supplied into said pressure vessel, into said perforated hollow pipe from at least the outer peripheral side of said spiral wound membrane element.

7. The treatment system according to claim 6, wherein said pretreater includes at least one of a sand filtration treater, activated sludge process equipment, a microfiltration membrane separation device, a centrifugal separator, a dipped membrane separation device, a pressure floatation treater, a coagulator, precipitation equipment, an ozone treater, a strong acid water treater, an ultraviolet bactericidal treater and a sodium hypochlorite bactericidal treater.

8. A treatment system comprising:

one or a plurality of pretreaters performing prescribed pretreatment and supplying a treated liquid to a prescribed succeeding stage system;

a spiral wound membrane module including a pressure vessel having a raw liquid inlet and one or a plurality of spiral wound membrane elements stored in said pressure vessel, wherein the spiral wound membrane element is disposed in the pressure vessel to allow raw liquid to flow through a space provided between an outermost peripheral surface of the spiral wound membrane element and the pressure vessel; and a duct, wherein said spiral wound membrane element includes:

a spiral membrane component including a perforated hollow pipe, a plurality of independent or continuous envelope membranes wound around the outer peripheral surface of said perforated hollow pipe and a raw liquid passage forming member interposed between said plurality of envelope membranes, a liquid-permeable material covering the outer peripheral portion of said spiral membrane component, and an outer peripheral passage forming member entirely or partially covering the outer peripheral surface of said liquid-permeable material, said duct is provided to supply a washing liquid, discharged from said one or a plurality of pretreaters in back wash reverse filtration of said one or a plurality of pretreaters, into said pressure vessel through said raw liquid inlet, and said raw liquid passage forming member is arranged to supply said washing liquid, supplied into said pressure vessel, into said perforated hollow pipe from at least the outer peripheral side of said spiral wound membrane element.

9. The treatment system according to claim 8, wherein said pretreater includes a sand filtration treater or an activated carbon treater.

10. A treatment method employing a treatment system comprising a spiral wound membrane module including a pressure vessel having a raw liquid inlet and one or a plurality of spiral wound membrane elements stored in said pressure vessel, wherein the spiral wound membrane element is disposed in the pressure vessel to allow raw liquid to flow through a space provided between an outermost peripheral surface of the spiral wound membrane element and the pressure vessel, and one or a plurality of reverse osmosis membrane separation devices, provided on a succeeding stage of said spiral wound membrane module, including a reverse osmosis membrane, said spiral wound membrane element including:

a spiral membrane component including a perforated hollow pipe, a plurality of independent or continuous envelope membranes wound around the outer peripheral surface of said perforated hollow pipe and a raw liquid passage forming member interposed between said plurality of envelope membranes, a liquid-permeable material covering the outer peripheral portion of said spiral membrane component, and an outer peripheral passage forming member entirely or partially covering the outer peripheral surface of said liquid-permeable material, said method comprising steps of:

supplying a raw liquid from at least the outer peripheral side of said spiral wound membrane element through said raw liquid inlet of said spiral wound membrane module and taking out a permeated liquid from at least one opening end of said perforated hollow pipe; and supplying taken-out said permeated liquid to said one or a plurality of reverse osmosis membrane separation devices.

11. The treatment method according to claim 10, wherein said one or a plurality of reverse osmosis membrane separation devices include a plurality of serially connected reverse osmosis membrane separation devices, said treatment method further comprising steps of:

supplying said permeated liquid from preceding stage said reverse osmosis membrane separation device to succeeding stage said reverse osmosis membrane separation device among said plurality of serially connected reverse osmosis membrane separation devices; and returning a concentrated liquid from said succeeding stage reverse osmosis membrane separation device to the supply side of said preceding stage reverse osmosis membrane separation device.

12. The treatment method according to claim 10, wherein said treatment system further comprises an ion exchanger provided on a succeeding stage of said one or a plurality of reverse osmosis membrane separation devices, said treatment method further comprising a step of supplying said permeated liquid from said one or a plurality of reverse osmosis membrane separation devices to said ion exchanger.

13. The treatment method according to claim 10, wherein said treatment system further comprises one or a plurality of pretreaters provided on a preceding stage of said spiral wound membrane module, said treatment method further comprising a step of performing prescribed pretreatment with said one or a plurality of pretreaters, said step of supplying a raw liquid including a step of supplying a treated liquid discharged from said pretreater to said spiral wound membrane module as said raw liquid.

14. The treatment method according to claim 13, wherein said step of performing pretreatment includes a step of performing at least one of treatment with a sand filtration treater, treatment with activated sludge process equipment, treatment with a microfiltration membrane separation device, treatment with a centrifugal separator, treatment with a dipped membrane separation device, treatment with a pressure floatation treater, treatment with a coagulator, treatment with precipitation equipment, treatment with an ozone treater, treatment with a strong acid water treater, treatment with an ultraviolet bactericidal treater and treatment with a sodium hypochlorite bactericidal treater.

15. The treatment method according to claim 10, wherein said step of supplying a raw liquid includes a step of continuously or intermittently feeding partial said raw liquid axially along the outer peripheral portion of said spiral wound membrane element and taking out said partial raw liquid from said pressure vessel.

16. A treatment method employing a treatment system comprising one or a plurality of pretreaters and a spiral wound membrane module, provided on a succeeding stage of said one or a plurality of pretreaters, including a pressure vessel having a raw liquid inlet and one or a plurality of spiral wound membrane elements stored in said pressure vessel, wherein the spiral wound membrane element is disposed in the pressure vessel to allow raw liquid to flow trough a space provided between an outermost peripheral surface of the spiral wound membrane element and the pressure vessel, said spiral wound membrane element including a spiral membrane component including a perforated hollow pipe, a plurality of independent or continuous envelope membranes wound around the outer peripheral surface of said perforated hollow pipe and a raw liquid passage forming member interposed between said plurality of envelope membranes, a liquid-permeable material covering the outer peripheral portion of said spiral membrane component, and an outer peripheral passage forming member entirely or partially covering the outer peripheral surface of said liquid-permeable material, said treatment method comprising steps of:

performing prescribed preteatment with said pretreater, and supplying a treated liquid, discharged from said pretreater, from at least the outer peripheral side of said spiral wound type membrane element through said raw liquid inlet of said spiral wound membrane module and taking out a permeated liquid from at least one opening end of said perforated hollow pipe.

17. The treatment method according to claim 16, wherein said step of performing pretreatment includes a step of performing at least one of treatment with a sand filtration treater, treatment with activated sludge process equipment, treatment with a microfiltration membrane separation device, treatment with a centrifugal separator, treatment with a dipped membrane separation device, treatment with a pressure floatation treater, treatment with a coagulator, treatment with precipitation equipment, treatment with an ozone treater, treatment with a strong acid water treater, treatment with an ultraviolet bactericidal treater and treatment with a sodium hypochlorite bactericidal treater.

18. The treatment method according to claim 16, wherein said step of supplying a treated liquid includes a step of continuously or intermittently feeding partial said treated liquid axially along the outer peripheral portion of said spiral wound type membrane element and taking out said partial treated liquid from said pressure vessel.

19. A treatment method employing a treatment system comprising one or a plurality of pretreaters performing prescribed pretreatment and supplying a treated liquid to a prescribed succeeding stage system, and a spiral wound membrane module including a pressure vessel having a raw liquid inlet and one or a plurality of spiral wound type membrane elements stored in said pressure vessel, wherein the spiral wound membrane element is disposed in the pressure vessel to allow raw liquid to flow through a space provided between an outermost peripheral surface of the spiral wound membrane element and the pressure vessel, said spiral wound membrane element including a spiral membrane component including a perforated hollow pipe, a plurality of independent or continuous envelope membranes wound around the outer peripheral surface of said perforated hollow pipe and a raw liquid passage forming member interposed between said plurality of envelope membranes, a liquid-permeable material covering the outer peripheral portion of said spiral membrane component, and an outer peripheral passage forming member entirely or partially covering the outer peripheral surface of said liquid-permeable material, said treatment method comprising steps of:

performing back wash reverse filtration of said one or a plurality of pretreaters; and supplying a washing liquid, discharged from said one or a plurality of pretreaters in said back wash reverse filtration, from at least the outer peripheral side of said spiral wound membrane element through said raw liquid inlet of said spiral wound membrane module and taking out a permeated liquid from at least one opening end of said perforated hollow pipe.

20. The treatment method according to claim 19, wherein said pretreater includes a sand filtration treater or an activated carbon treater.

21. The treatment method according to claim 19, wherein said step of supplying a washing liquid includes a step of continuously or intermittently feeding partial said washing liquid axially along the outer peripheral portion of said spiral wound membrane element and taking out said partial washing liquid from said pressure vessel.

* * * * *